(12) United States Patent
Allsworth et al.

(10) Patent No.: US 11,513,098 B2
(45) Date of Patent: Nov. 29, 2022

(54) SPECTROMETRY SYSTEM

(71) Applicants: Owlstone Medical Limited, Cambridge (GB); Owlstone Inc., Westport, CT (US)

(72) Inventors: Max Allsworth, Essex (GB); Julian William Few, Cambridge (GB); Isabel Marquez Sillero, Cambridge (GB); Jonathan Pearson, Cambridge (GB)

(73) Assignees: Owlstone Medical Limited, Cambridge (GB); Owlstone Inc., Westport, CT (US)

( * ) Notice: Subject to any disclaimer, the term of this patent is extended or adjusted under 35 U.S.C. 154(b) by 307 days.

(21) Appl. No.: 16/767,264

(22) PCT Filed: Nov. 29, 2018

(86) PCT No.: PCT/GB2018/053460
§ 371 (c)(1),
(2) Date: May 27, 2020

(87) PCT Pub. No.: WO2019/106373
PCT Pub. Date: Jun. 6, 2019

(65) Prior Publication Data
US 2021/0025850 A1    Jan. 28, 2021

(30) Foreign Application Priority Data
Nov. 29, 2017  (GB) ...................... 1719819

(51) Int. Cl.
*G01N 27/62*     (2021.01)
*G01N 27/624*    (2021.01)

(52) U.S. Cl.
CPC .................. *G01N 27/624* (2013.01)

(58) Field of Classification Search
CPC ....... G01N 27/622; G01N 27/624; G01N 1/24
See application file for complete search history.

(56) References Cited

U.S. PATENT DOCUMENTS

2005/0253061 A1*  11/2005  Cameron ............. G01N 27/624
                                                        250/287

OTHER PUBLICATIONS

European Patent Office, International Search Report and Written Opinion, PCT/GB2018/053460, dated Mar. 29, 2019.

* cited by examiner

*Primary Examiner* — David E Smith
*Assistant Examiner* — Hsien C Tsai
(74) *Attorney, Agent, or Firm* — Leveque Intellectual Property Law, P.C.

(57) ABSTRACT

We describe a method and apparatus for detecting humidity using a Field Asymmetric Ion Mobility Spectrometry (FAIMS) system. The system may comprise an ionizer for generating ions within a gas sample, wherein each ion has an associated ion mobility; an ion filter for separating the ions by applying a compensation field and a dispersion field to the generated ions; a detector for detecting an output from the ion filter; and a processor. The processor may be configured to extract a spectrum of peak intensity of the detected output as a function of the compensation field and the dispersion field; calculate a turning point for the extracted spectrum; determine operating parameters of the field asymmetric ion mobility system; obtain, from a database, a plurality of known turning points each of which have an associated humidity and each of which were obtained using a field asymmetric ion mobility system having operating parameters aligned with the determined operating parameters; and determine the humidity by comparing the calculated turning point with known turning points.

16 Claims, 28 Drawing Sheets

SPECTROMETRY SYSTEM

TECHNICAL FIELD

The present invention relates to devices and methods for ion mobility systems. More specifically, the invention relates to a method and apparatus for detecting humidity using a Field Asymmetric Ion Mobility Spectrometry (FAIMS) system.

BACKGROUND

The ability to ionize gases using ion mobility systems is useful for a wide range of applications including many chemical detection applications. Ionization techniques, in which a gas sample is ionized and then separated into constituent parts that can be detected individually, are widely used for gas composition sensing. Two well-known examples are Ion Mobility Spectrometry (IMS) and Field Asymmetric Ion Mobility Spectrometry (FAIMS), also known as Differential Mobility Spectrometry (DMS). Ion mobility detection techniques tend to be very well suited to measuring trace constituents of gas mixtures that often consist of a carrier gas with additional gases mixed in at low concentrations (for example part-per-million or part-per-billion levels).

Ion mobility techniques can also be used effectively over a range of gas pressures, including pressures close to one atmosphere. This makes them useful for, amongst other things, measuring low-level impurities in air. The sample gas is passed through an ionizer to produce a population of ionized molecules that are then manipulated in some way involving separation or selection of ionized molecules according to their behaviour in an electric field, before being detected. Ionizers commonly in use include radioactive sources, light-based devices such as ultra-violet lamps, and electrostatic devices such as corona discharge ionizers.

Stability and repeatability of DMS spectra are important issues in the use of DMS in analytical applications, as explained for example in "*Temperature effects in differential mobility spectrometry*" by Krylov et al in International Journal of Mass Spectrometry 279 (2009) 119-125. Various factors, including humidity, are known to influence the field dependence of ion mobility, changing peak positions in the DMS spectra.

The present applicant has recognised the need to address humidity issues with ion mobility systems.

SUMMARY

According to the present invention there is provided a system and method as set forth in the appended claims. Other features of the invention will be apparent from the dependent claims, and the description which follows.

We describe a method of determining humidity using a field asymmetric ion mobility system, the method comprising: generating ions within a gas sample flowing through the field asymmetric ion mobility system; applying a compensation field and a dispersion field to the generated ions; measuring an output ion current; extracting a spectrum of peak intensity of the measured output as a function of the compensation field and the dispersion field; calculating a turning point for the extracted spectrum; determining operating parameters of the field asymmetric ion mobility system; obtaining, from a database, a plurality of known turning points each of which have an associated humidity value and each of which were obtained using a field asymmetric ion mobility system having operating parameters which are aligned with the determined operating parameters; and determining a value for the humidity by comparing the calculated turning point with known turning points.

In this way, a FAIMS may be used as a hygrometer and thus measure the humidity. For example, the FAIMS may be used to measure the humidity of air. The sequence of steps may be completed relatively quickly so that the humidity measurement can be done in real time.

The value of humidity may be expressed as a percentage, e.g. a percentage by volume which may be in the range of 0 to 3% where 3% represents total saturation, or a percentage by mass. By adjusting the compensation and dispersion fields, ions from a particular chemical species may be selected or filtered by the FAIMS. When using a FAIMS as a hygrometer, applying a compensation field and a dispersion field to the generated ions may comprise applying a compensation field and dispersion field to filter water ions from the generated ions. In this way, the measured output ion current may measure the ion current which is output from water ions.

Various factors are known to influence the output from a FAIMS. Accordingly, the method comprises determining the operating parameters which will affect the output, including for example temperature and pressure. The operating parameters may be determined by using appropriate sensors which may be incorporated in the system, e.g. a temperature sensor and/or a pressure sensor. The sensors may collect the data in real-time. Alternatively, the operating parameters may be determined from a database which stores information about the operating parameters for different environments. The plurality of known turning points may be obtained for a field asymmetric ion mobility system having at least two operating parameters which are the same as the determined operating parameters. Alternatively, the plurality of known turning points may be obtained for a system having a plurality of operating parameters (e.g. three or more) which are all within a threshold (e.g. 5%) of the determined operating parameters. In other words, the operating parameters may be considered to be aligned with the determined operating parameters if either a minimum number of parameters are equal to one another or a number of parameters are within an acceptable range of each other.

Extracting a spectrum of peak intensity may comprise plotting the measured output ion current as a function of dispersion field against compensation field; determining points of peak intensity within the plot and generating the spectrum of the peak intensity using the determined points. Known techniques may be used to plot the measured output ion current and to determine the points of peak intensity. The method may further comprise plotting the spectrum of peak intensity as a function of dispersion field against compensation field. In this way, the spectrum may be a line graph. Calculating a turning point may comprise calculating the turning point (i.e. the stationary point) in the generated line graph, e.g. locating the point on the line graph having a zero gradient. Alternatively, the spectrum may be presented in any suitable form, e.g. a table of data points and the turning point may be calculated from the spectrum using any suitable technique. By turning point it is meant a stationary point at which the value for the dispersion field stops increasing or decreasing relative to the value of the compensation field.

Determining a value for the humidity comprises determining a pair of known turning points defining a range within which the calculated turning point is located and extrapolating a humidity value for the calculated turning point from the humidity values associated with the pair of known turning points. A first known turning point may be higher than the calculated turning point and may thus be the upper limit of the range. Similarly, a second known turning point in the pair may be lower than the calculated turning point and may thus be the lower limit of the range. The pair of known turning points may be the pair defining the smallest range, i.e. the first and second known turning points may be the points closest in value to the calculated turning points. The humidity value may be extrapolated using any known technique, e.g. a best fit line may be determined between the pair of known turning points and the value of the humidity simply "read" off the best fit line.

There may be more than one pair of known turning points which define a range within which the calculated turning point is located. The method may thus comprise determining two pairs of known turning points each of which define a range within which the calculated turning point is located, selecting a preferred pair and extrapolating the humidity value using the preferred pair. Selecting a preferred pair may comprise considering the range of humidity values defined by the pair and rejecting a pair having a range which is smaller than a predetermined value (e.g. a range having a difference between upper and lower limits of less than 0.1%). In a small range, it will be difficult to accurately interpolate a value for the humidity. Alternatively, selecting a preferred pair may comprise rejecting the pair having at least one value below a threshold humidity value which represents an almost completely dry environment (e.g. 0.25%).

Both positive and negative ions may be generated in the generating step. The method may thus comprise extracting a first spectrum of peak intensity for the negative ions; calculating a first turning point, obtaining a first plurality of known turning points each of which have an associated humidity and each of which were obtained using negative ions; and determining a first humidity value from the first calculated turning point and the first plurality of known turning points. Similarly, the method may thus comprise extracting a second spectrum of peak intensity for the positive ions; calculating a second turning point, obtaining a second plurality of known turning points each of which have an associated humidity and each of which were obtained using positive ions; and determining a second humidity value from the second calculated turning point and the second plurality of known turning points. It will be appreciated that first and second can be used interchangeably, e.g. the first humidity value could be determined using the positive ions and the second humidity value could be determined using the negative ions. Where two values are determined, the method may further comprise comparing the first and the second determined humidity values and selecting one of the first and second humidity values as the determined humidity value. Selecting may comprise considering rejecting the value which is below a lower threshold humidity value which represents an almost completely dry environment (e.g. 0.25%) or above an upper threshold humidity value which represents an almost saturated environment (e.g. 2.75%). Both such environments are unlikely. Alternatively, the determined humidity value may be an average of the first and second values.

Alternatively, the humidity value may be determined by using other parameters such as peak width or location. Peak width may be determined by plotting the dispersion field against compensation field and extracting the locations of peak intensity as described above. Thereafter, the widths of the locations of peak intensity which are extracted may be determined. Peak location may be determined by plotting the dispersion field against compensation field and extracting the peak values for the compensation field for a particular set value of the dispersion field (or vice versa). The system parameters may also be determined. A stored plot of peak width or location against humidity for the system having aligned parameters with the determined parameters may then be obtained and the humidity may be determined using this stored plot. A humidity value which has been calculated using the turning point may be checked against a humidity value determined using peak width/location. This is particularly useful if the turning point and/or peak width/location generates more than one humidity value because a single humidity value which appears in both results may then be selected as the output.

The method may further comprise building the database which may be done prior to determining the humidity. Building the database may comprise setting the operating parameters of a test field asymmetric ion mobility system, wherein the operating parameters include the humidity of a gas sample being sampled by the system and calculating the turning point in the same manner as described above and storing the calculated turning point together with the set operating parameters wherein the calculated turning point is associated with the set humidity. In other words, the method may comprise generating ions within the gas sample flowing through the test field asymmetric ion mobility system, applying a compensation field and a dispersion field to the generated ions; measuring an output ion current; extracting a spectrum of peak intensity of the measured output as a function of the compensation field and the dispersion field and calculating a turning point for the extracted spectrum. The method may comprise calculating peak location and/or peak width for the extracted spectrum; and storing the calculated peak location and/or peak width together with the set operating parameters wherein the calculated peak location and/or peak width is associated with the set humidity The database comprises a plurality of known values and thus the method may comprise adjusting the humidity of the gas sample flowing through the test field asymmetric ion mobility system and repeating the generating, applying, measuring, extracting and storing steps. The adjusting and the repeating steps may be performed until there is sufficient data, for example, four or more values for a particular set of operating parameters. The humidity may be set at several different humidity values, e.g. 0.5%, 1.0%, 1.5%, 2.0%, 2.5% and 3% expressed as percentage water by volume.

The database comprises a plurality of known values for different operating parameters. Thus the method may comprise changing an operating parameter of the test field asymmetric ion mobility system and repeating the generating, applying, measuring, extracting and storing steps. For the changed operating parameter, the adjusting of the humidity and the repeating steps may be performed until there is sufficient data. It will be appreciated that there may not be a plurality of known values for a test system having operating parameters which exactly match the determined operating parameters. Accordingly, the plurality of known values for a test system having aligned operating parameters may be obtained. By aligned, it is meant that either the number of operating parameters in common is above a threshold or individual parameters are within an acceptable threshold range, e.g. within 5 degrees for a set temperature.

We also describe a method of determining humidity using a field asymmetric ion mobility system, the method comprising: generating ions within a gas sample flowing through the field asymmetric ion mobility system; applying a compensation field and a dispersion field to the generated ions; measuring an output ion current; extracting a spectrum of peak intensity of the measured output as a function of the compensation field and the dispersion field; calculating a peak location for compensation field the extracted spectrum at a particular value for the dispersion field; determining operating parameters of the field asymmetric ion mobility system; obtaining, from a database, a plurality of known peak locations each of which have an associated humidity value and each of which were obtained using a field asymmetric ion mobility system having operating parameters which are aligned with the determined operating parameters; and determining a value for the humidity by comparing the calculated peak location with known peak locations. As explained above, this method can be used in conjunction with the use of turning points to generate more than one humidity value so that the humidity values generated using different methods can be validated against each other.

The methods described above may be performed by a field asymmetric ion mobility spectrometry. Thus, the ions may be generated using an ionizer, a drive signal system may be used to generate the compensation field and the dispersion field and the output may be measured (or detected) by a detector. The compensation field and the dispersion field may be considered to separate ions within an ion filter. Thus, we also describe a spectrometry system comprising: an ionizer for generating ions within a gas sample wherein each ion has an associated mobility; an ion filter for separating the ions by applying a compensation field and a dispersion field to the generated ions; a detector for detecting an output from the ion filter; and a processor configured to extract a spectrum of peak intensity of the detected output as a function of the compensation field and the dispersion field; calculate a turning point for the extracted spectrum; determine operating parameters of the spectrometry system; obtain, from a database, a plurality of known turning points each of which have an associated humidity and each of which were obtained using a field asymmetric ion mobility system having operating parameters aligned with the determined operating parameters; and determine the humidity by comparing the calculated turning point with known turning points.

The system may further comprise a drive signal system which applies a compensation field and a dispersion field to the ion filter to separate the ions. It will be appreciated that the features above described in relation to the method also apply to the system.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1b is a schematic illustration of a channel within an ion filter in the system of FIG. 1a;

FIG. 1c is an alternative schematic illustration of the spectrometry system of FIG. 1a;

FIGS. 2a and 2b are a flowchart illustrating a method of using a spectrometry system such as the one shown in FIG. 1a;

FIG. 6 is a graph in which a turning point has been plotted on the graph of FIG. 5a;

FIG. 9 is a graph plotting the turning point versus humidity for each of the line graphs shown in FIG. 8a;

DETAILED DESCRIPTION OF DRAWINGS

Figure 1A:
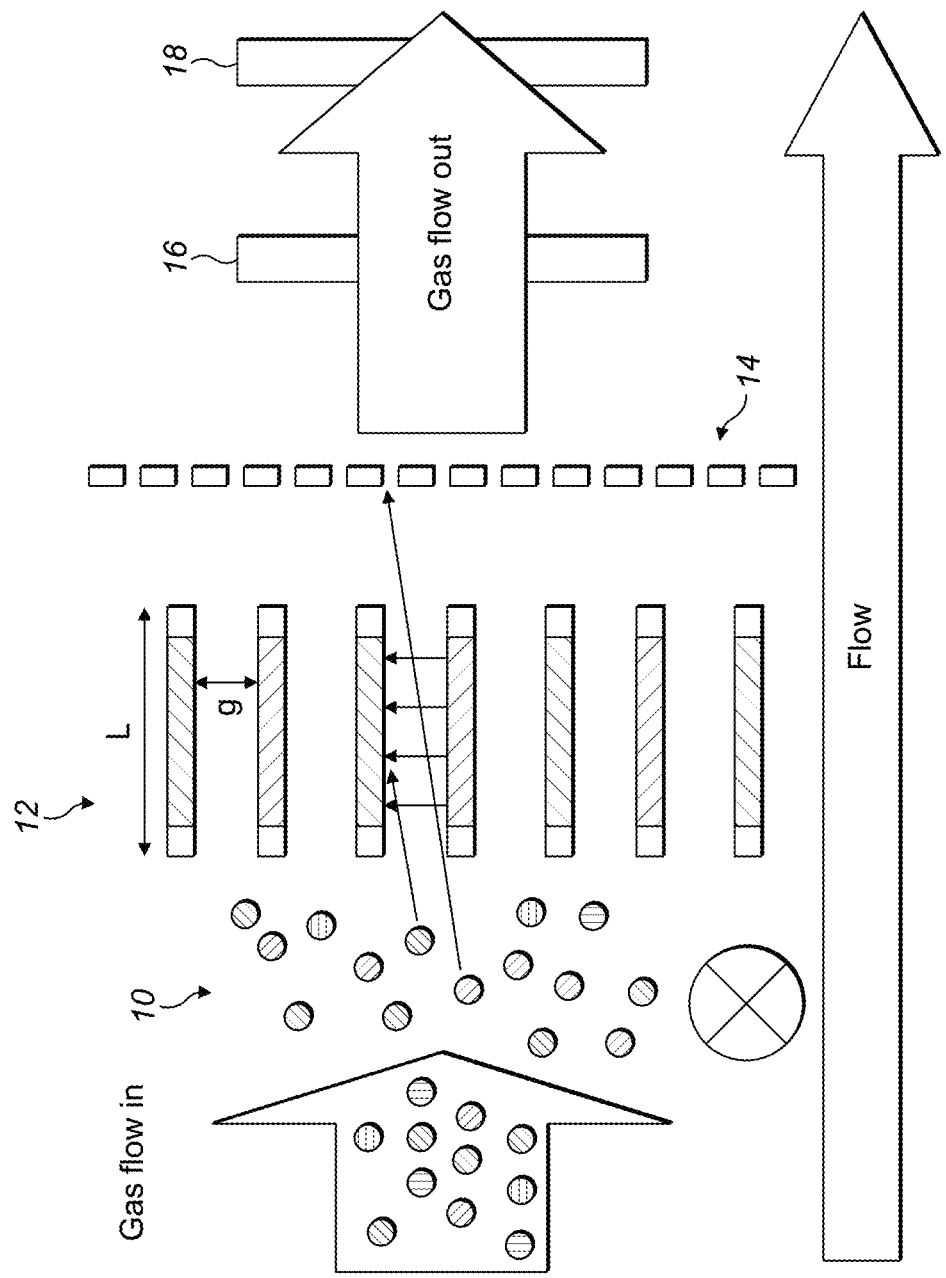
FIG. 1a is a schematic illustration of a spectrometry system.
Figure 1B:
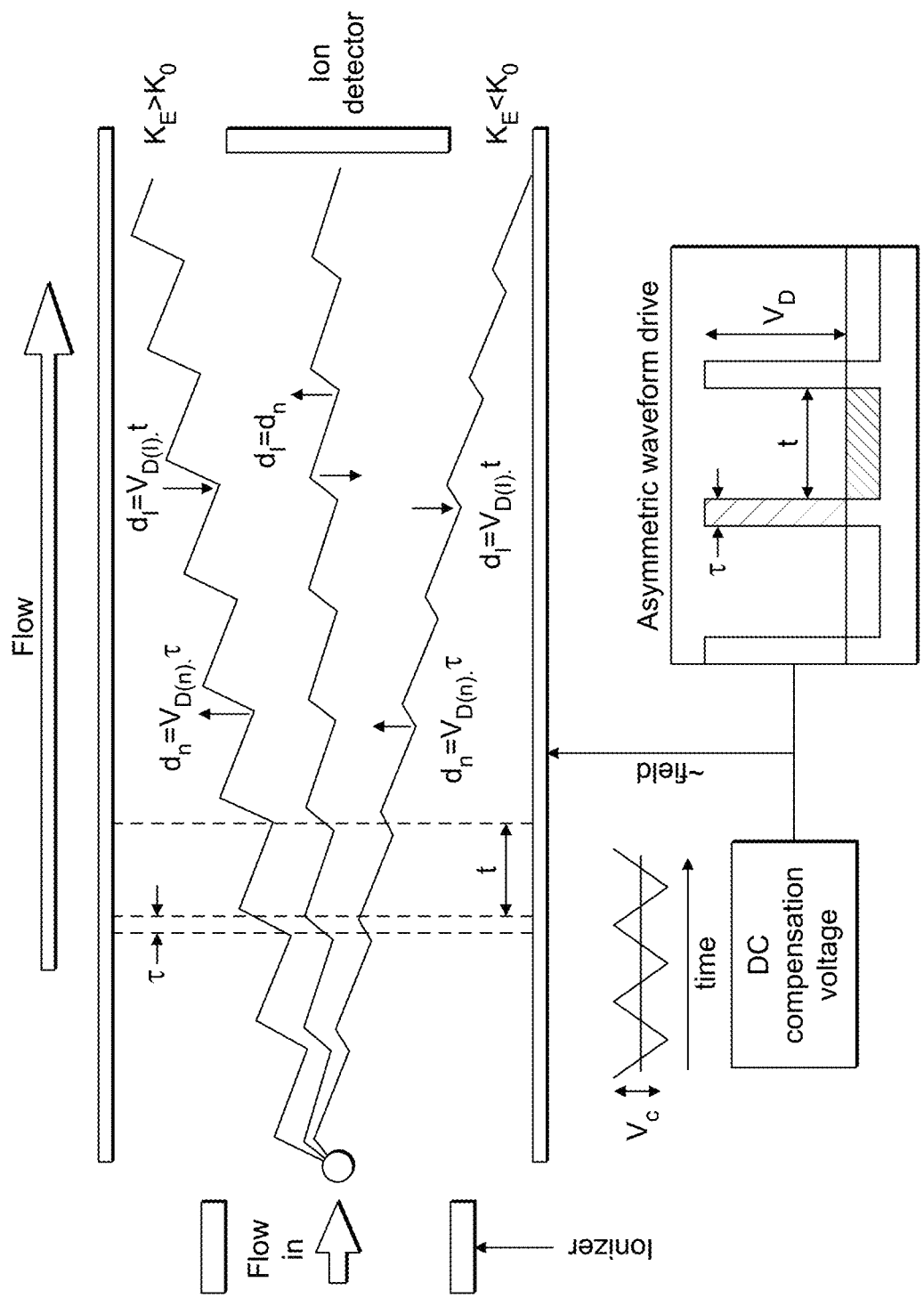
Figure 1C:
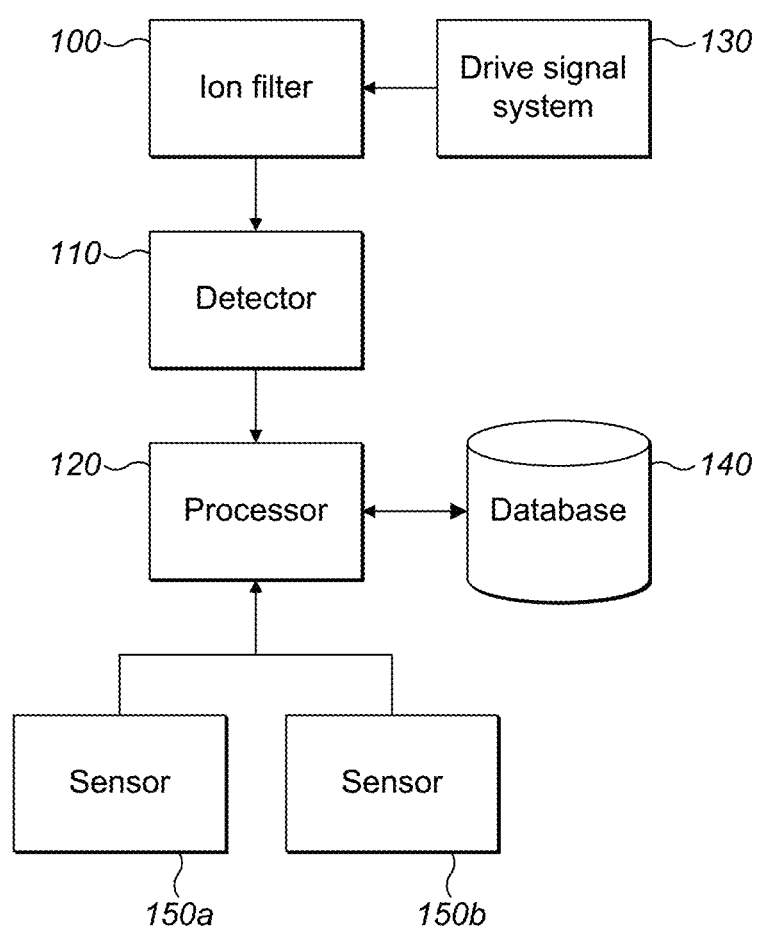

FIGS. 1a to 1c shows a schematic illustration of a spectrometry system which may be a miniature device as described in "Characterisation of a miniature, ultra-high field, ion mobility spectrometer" by Wilks et al published in Int. J. Ion Mobil Spec. (2012) 15:199-222. As shown in FIG. 1a, gas flows into an ionizer 10 and the generated ions then pass through an ion filter 12. The ion filter separates the ions and may thus be termed an ion separator. In the illustrated example, the ion filter has a plurality of ion channels each having a small gap width (g of around 30 to 50 μm) and relatively short length (e.g. L around 300 μm). The gap surfaces are made of high-conductivity silicon (or similar material) and are electrically connected via wire bonding to metal pads on the face of the silicon. Ions exiting from the ion separator are detected by an ion detector 14. It is known that temperature and pressure can affect the results and thus a temperature sensor 16 and/or a pressure sensor 18 may also be included in the system. These are shown schematically on the output gas flow but could be incorporated into another appropriate location within the device.

As shown in FIG. 1b, an oscillating electric field is applied to the ion separator. A variable high-voltage asymmetric waveform of low voltage pulse duration t(s) and high voltage pulse duration τ(s) and peak voltage $V_D$ is applied to create the variable field of $V_D/g$ (kVcm$^{-1}$). The mobility of each ion within the ion separator oscillates between a low-field mobility $K_0$ and a high-field mobility $K_E$ and the difference between the high-field mobility and low field mobility is termed ΔK. Ions of different chemicals will have different values of ΔK and the ions adopt a net longitudinal drift path length ($d_h$-$d_t$) through the ion filter which is determined by their high and low field drift velocity ($v_{D(h)}$ and $v_{D(l)}$) and the high field and low field pulse durations. Only ions in a "balanced" condition such as the middle ion in FIG. 1b will exit from the ion separator and be detected by the ion detector. Ions which contact either of the sides of the ion channel will not be detected. A bias DC "tuning voltage" ($V_c$) is applied on top of the applied waveform to enable subtle adjustment of the peak voltage $V_D$ to counter the drift experienced by an ion of a specific ΔK.

As shown schematically in FIG. 1c, a drive signal system 130 applies the asymmetric waveform and the tuning voltage to the ion filter 100 as described above. The output ions from the ion filter 100 are detected by the detector 110. The output from the detector 110 is sent to a processor 120 which may be local (i.e. within the ion filter) or remote (i.e. in a separate computer/server). The processor is adapted to extract numerical parameters which facilitate chemical detection, identification, classification and/or quantification of the ions. For example, the processor may be configured to generate an output in which the measurement of ion current at the detector is plotted as a function of the applied electric field resulting from the asymmetric waveform which is known as the dispersion field $E_D$ (kVcm$^{-1}$) and the applied electric field resulting from the DC voltage which is known as the compensation field $E_C$ (kVcm$^{-1}$). The processor is also configured to receive inputs from sensors 150a, 150b in the system, for example a pressure or temperature sensor. The spectral output may alternatively be presented as an m×n matrix of ion current measurements at m compensation field and n dispersion field settings. The outputs are compared to a database 140 of similar outputs which have been previously gathered to determine the nature of the ions that have been detected. The database may be located in a memory with the spectrometer housing, e.g. on a PCB within the housing.

Figure 2A:
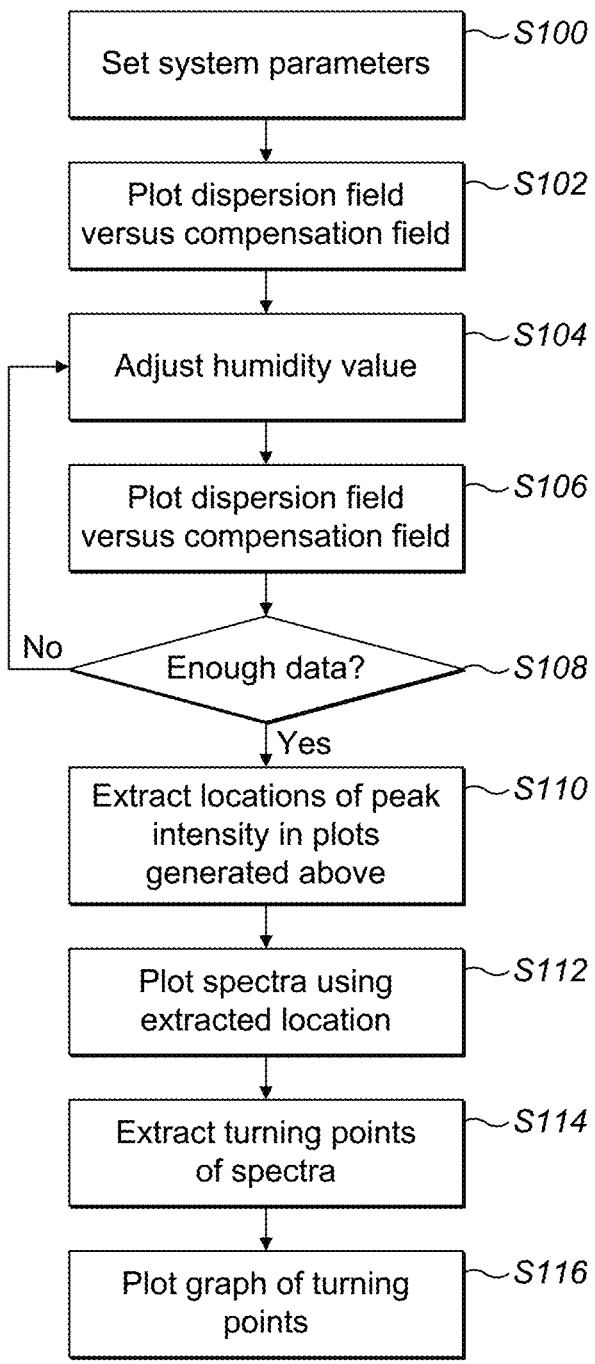
Figure 2B:
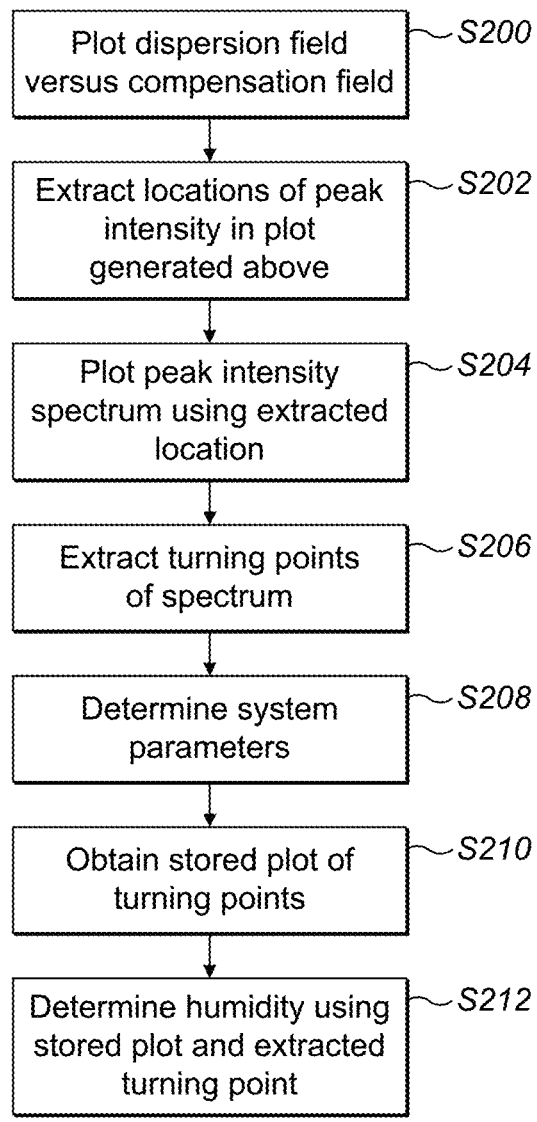

FIGS. 2a and 2b are flowcharts illustrating the steps of the method of determining humidity. FIG. 2a shows the steps in the first phase which is a calibration (or data gathering) phase used to build a database (or library) of results. FIG. 2b shows the steps of a second phase, namely a determining phase, and shows how the database generated in FIG. 2a may be used.

The first step S100 in the calibration phase of FIG. 2a is to fix the parameters (or variables) of the ion spectrometry system, in particular the parameters which are known to influence the output, e.g. pressure, temperature, humidity, the gas being sampled, flow rate through the system. For the temperature setting, the temperature at various points within the system may be set, e.g. the temperature at the inlet. The system is then operated at these set parameters and the output is generated, for example a plot of dispersion field versus compensation field (S102). The output is generated using known techniques. For example, the compensation and dispersion fields are varied and the measured ion current is recorded for each value of the compensation and dispersion field. The measured ion current may then be plotted as "heat maps" where the intensity is colour coded to differentiate higher intensity from lower intensity, e.g. as shown in FIGS. 3a to 3h. The parameters for this particular output are preferably captured together with the output itself.

Once the results have been gathered for a particular set of parameters, the humidity value, namely the water concentration, is adjusted. For example, the water concentration may be adjusted from 0% (i.e. completely dry) to 0.25%. The operation is then repeated with all other parameters unchanged and the output for this set of parameters is generated which again could be a plot of the dispersion field against the compensation field as shown at step S106. Although only the humidity is changed, there may be slight variations in the other parameters and thus the complete set of parameters for this particular output is also preferably captured together with the output itself.

A decision on whether or not enough data has been gathered at step S108 and if not, the adjustment of humidity value at step S104 and the output step S106 is then repeated to cover several different humidity values, e.g. 0.5%, 1.0%, 1.5%, 2.0%, 2.5% and 3% (effectively fully saturated). These humidity values are expressed as percentage by volume. It will be appreciated that these values are arbitrary and other values can be used.

Figure 3A:
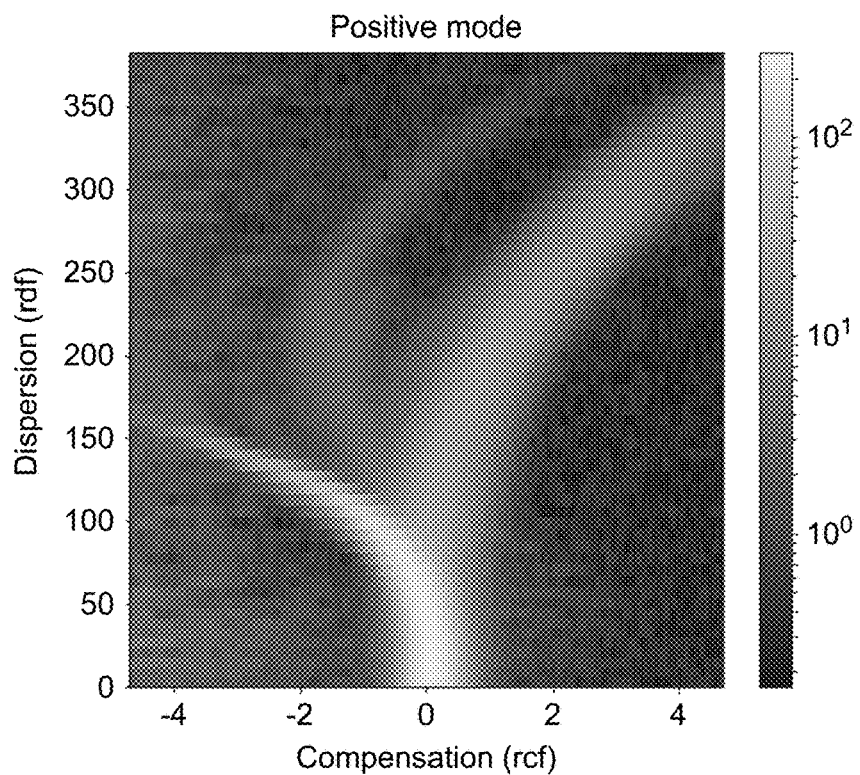
FIGS. 3a to 3d are graphs plotting the dispersion field versus compensation field for the positive mode at water concentrations of 0%, 0.5%, 1.5% and 3% percentage by volume.
Figure 3B:
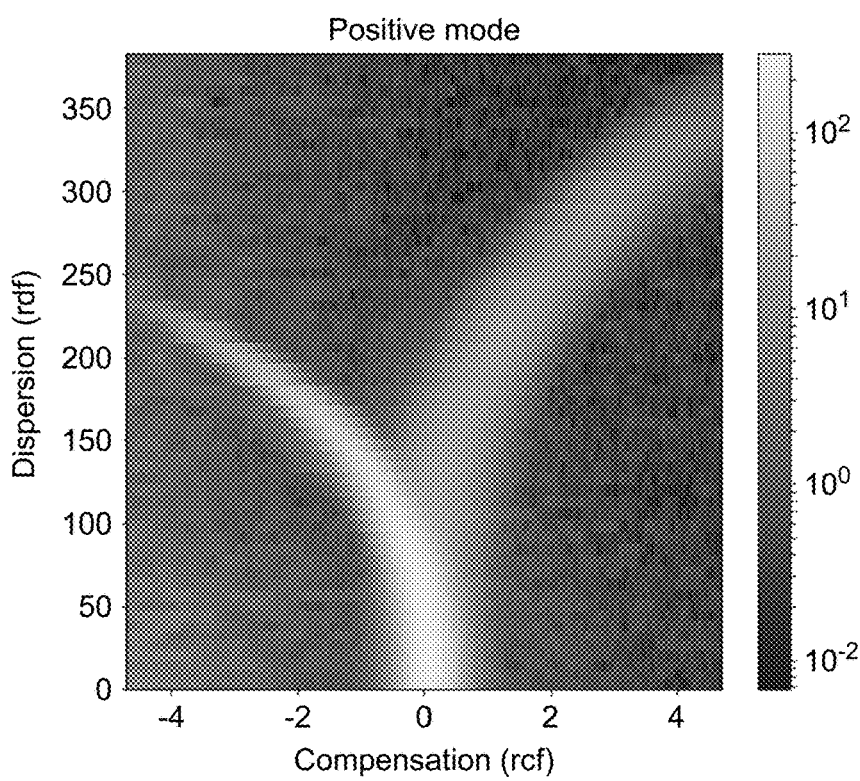
Figure 3C:
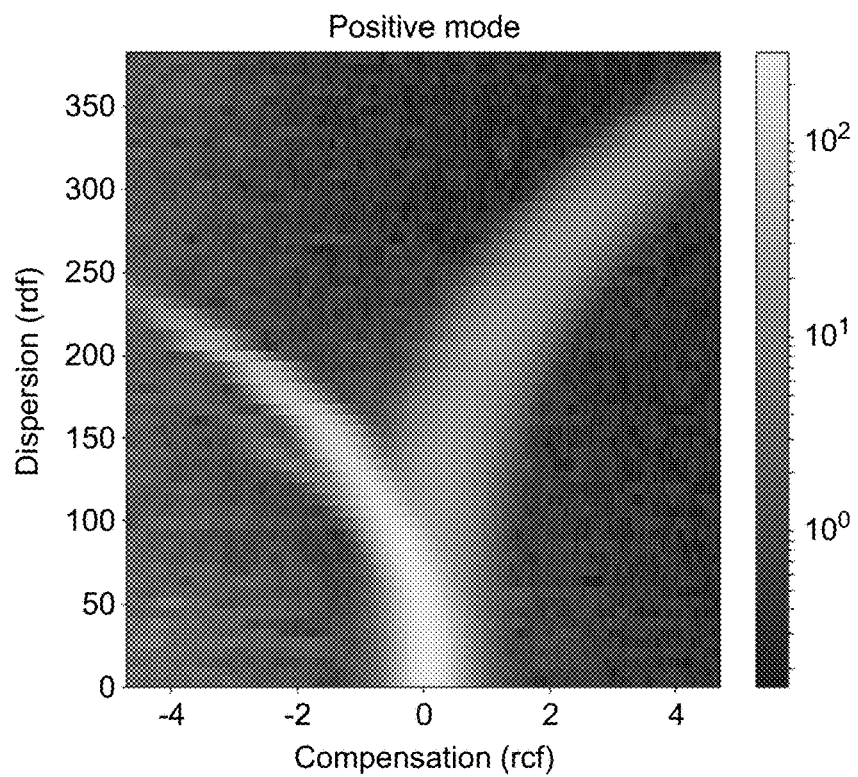
Figure 3D:
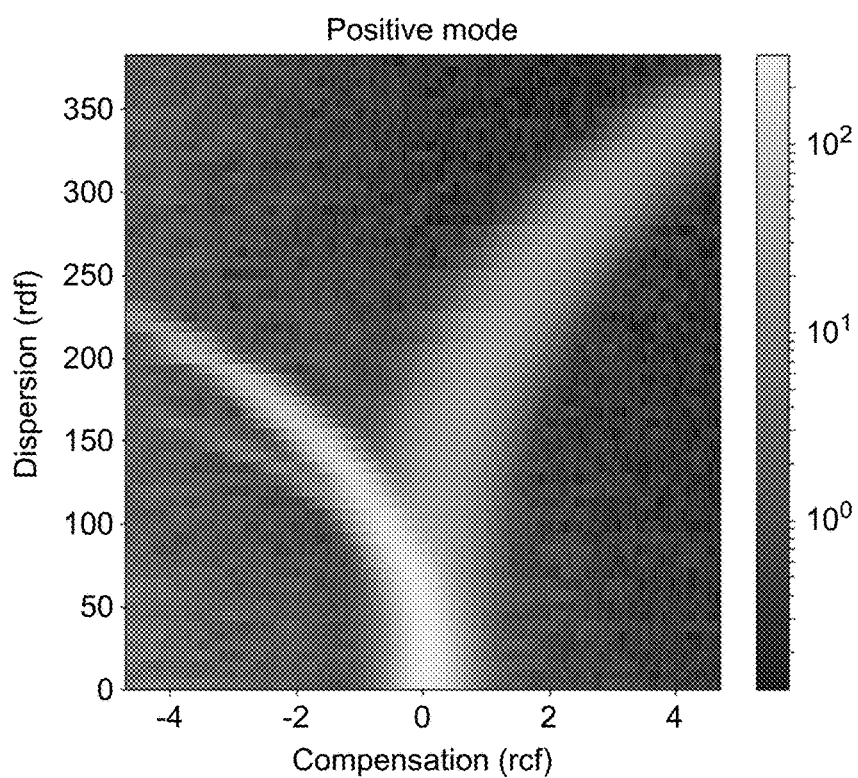
Figure 3E:
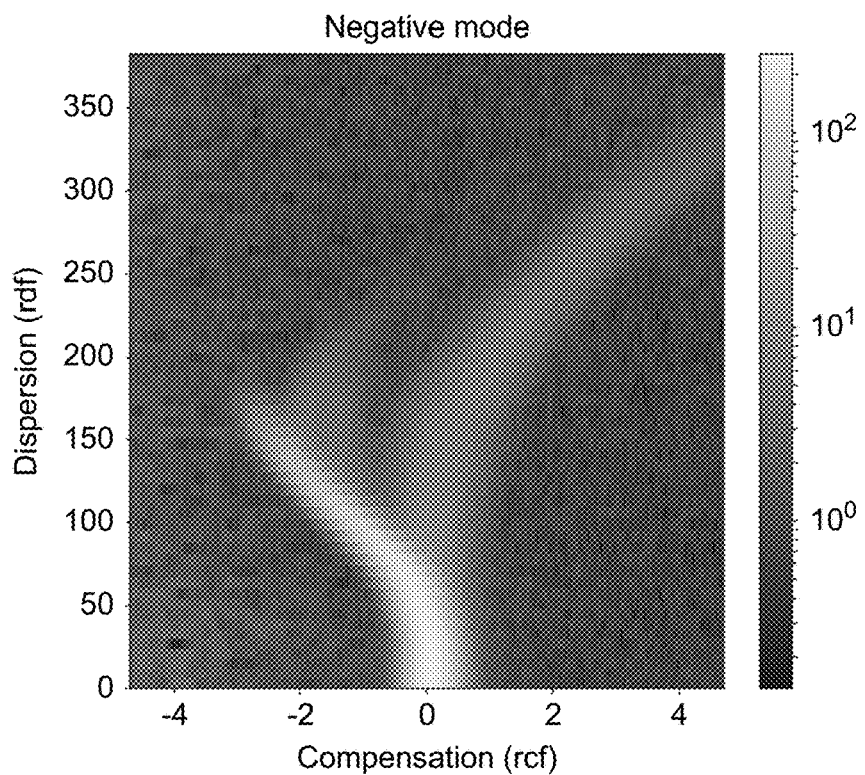
FIGS. 3e to 3h are graphs plotting the dispersion field versus compensation field for the negative mode at water concentrations of 0%, 0.5%, 1.5% and 3% percentage by volume.
Figure 3F:
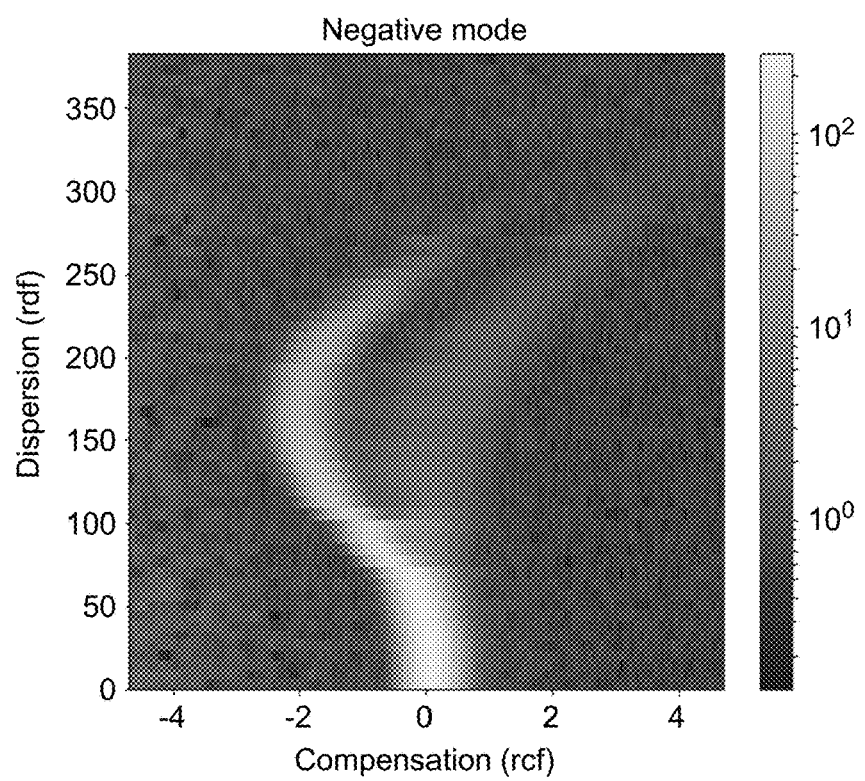
Figure 3G:
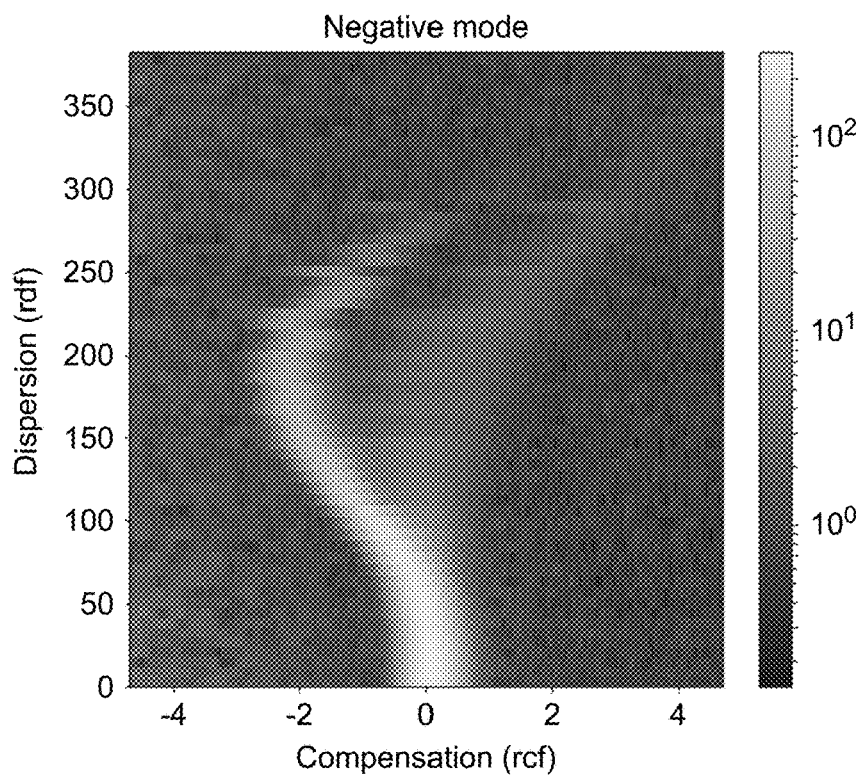
Figure 3H:
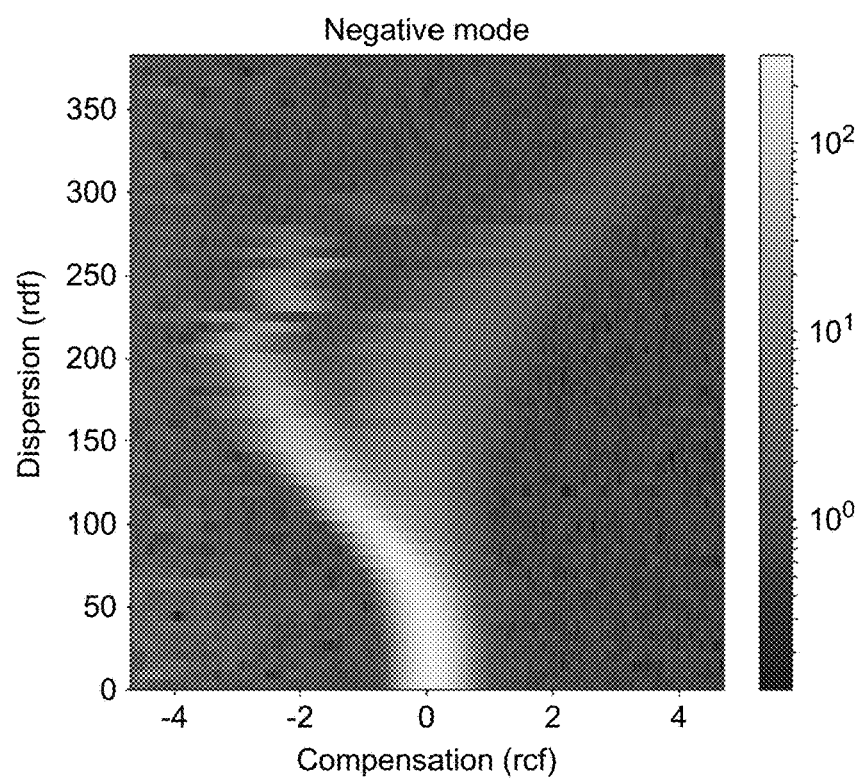

The results of steps S100 to S108 are illustrated in FIGS. 3a to 3h for a system in which the temperature is fixed at 150 degrees Celsius. The other parameters in the system which may impact the output are also fixed and recorded, for example system flow: 2320 ml/min; chip bias 54V and chip gap: 64.19 micron. A sample of air having a fixed concentration of water is passed through the system. FIG. 3a plots the dispersion field (rdf) against compensation field (rcf) for the positive mode (i.e. positive ions generated from the water) at 0% water concentration. In this example, 0% water concentration means that no water is added to the gas sample. There is however a background water level present in the air (from a gas cylinder) which is used to flow the sample through the system. Accordingly, water ions are detected at 0% water concentration. Similarly, FIG. 3e plots the dispersion field (rdf) against compensation field (rcf) for the negative mode (i.e. negative ions generated by the chemical sample) at 0% water concentration. The intensity of the output is illustrated using the colour coding to the side of the image with the brightest colour indicating the greatest intensity. The highest intensity is above $10^2$ (i.e. above 100) with the scale showing $10^1$ in the middle and $10^0$ towards the lower third of the scale. FIGS. 3b and 3f are the corresponding graphs at a water concentration of 0.5%. Both FIGS. 3b and 3f show a different result when compared to the graphs at a lower water concentration with the change being perhaps the most noticeable for the negative mode. FIGS. 3c and 3g are the corresponding graphs at a water concentration of 1.5% and FIGS. 3d and 3h are the corresponding graphs at a water concentration of 3%. The change is once again more noticeable for the negative mode. FIGS. 3a to 3h are merely illustrative of the graphs that could be collected at various different water concentrations.

Figure 4A:
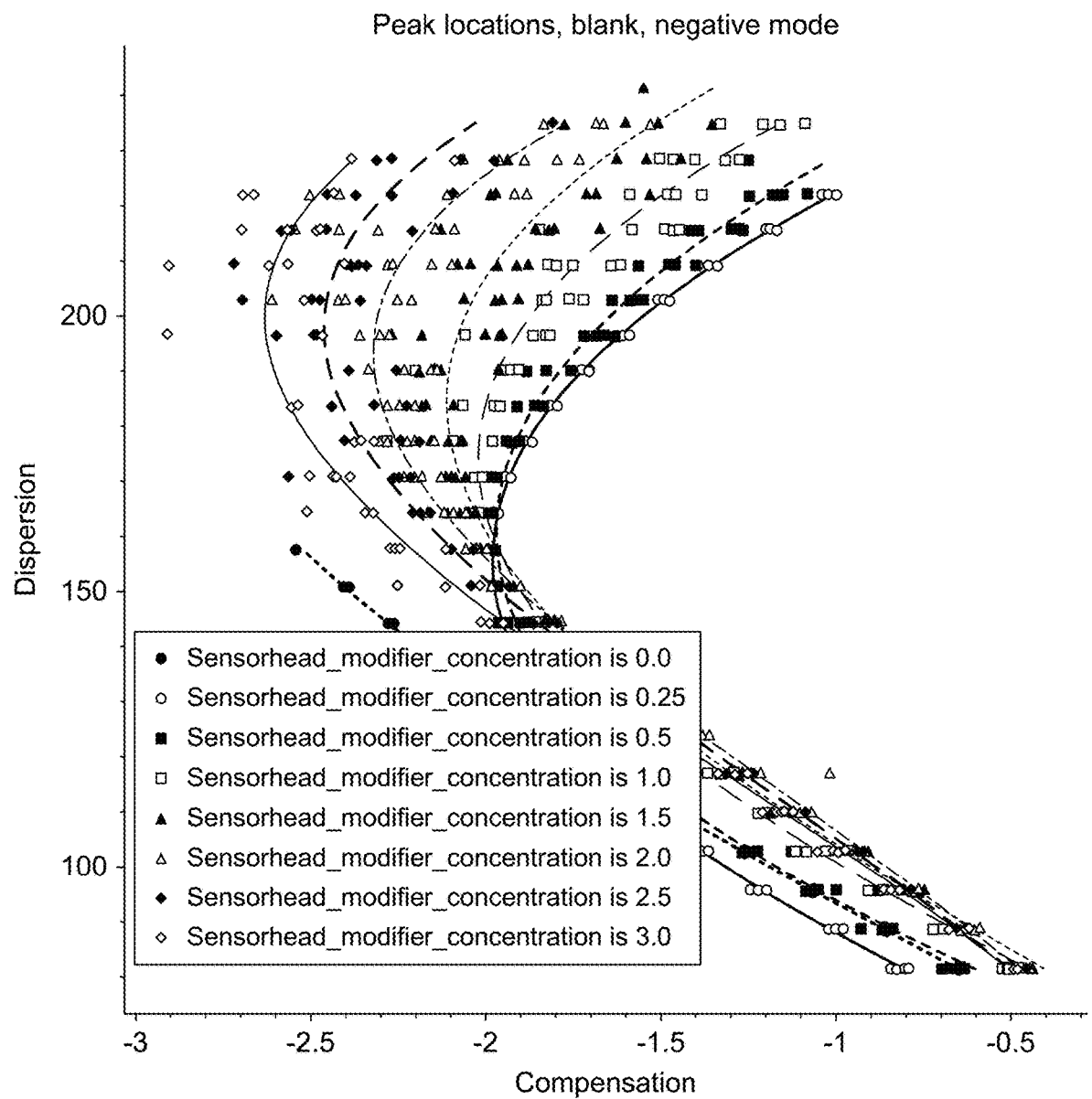
FIG. 4a is a graph plotting the locations of the peak values in the dispersion field versus compensation field graphs shown in FIGS. 3e to 3h.

Returning to FIG. 2a, when sufficient outputs have been gathered, the next step S110 is to extract a plurality of locations of peak intensity for the compensation field versus dispersion field outputs. These locations of peak intensity are plotted on a graph of compensation field versus dispersion field. The extraction of the data and its plotting on a graph are done using known techniques. An example of the plot of peak locations is shown in FIG. 4a which shows the locations as points on a plot of dispersion field against compensation field. The points for each of the results obtained in the previous steps are plotted, which as shown in this example is at humidity values, of 0%, 0.25%, 0.5%, 1.0%, 1.5%, 2.0%, 2.5% and 3%.

Figure 4B:
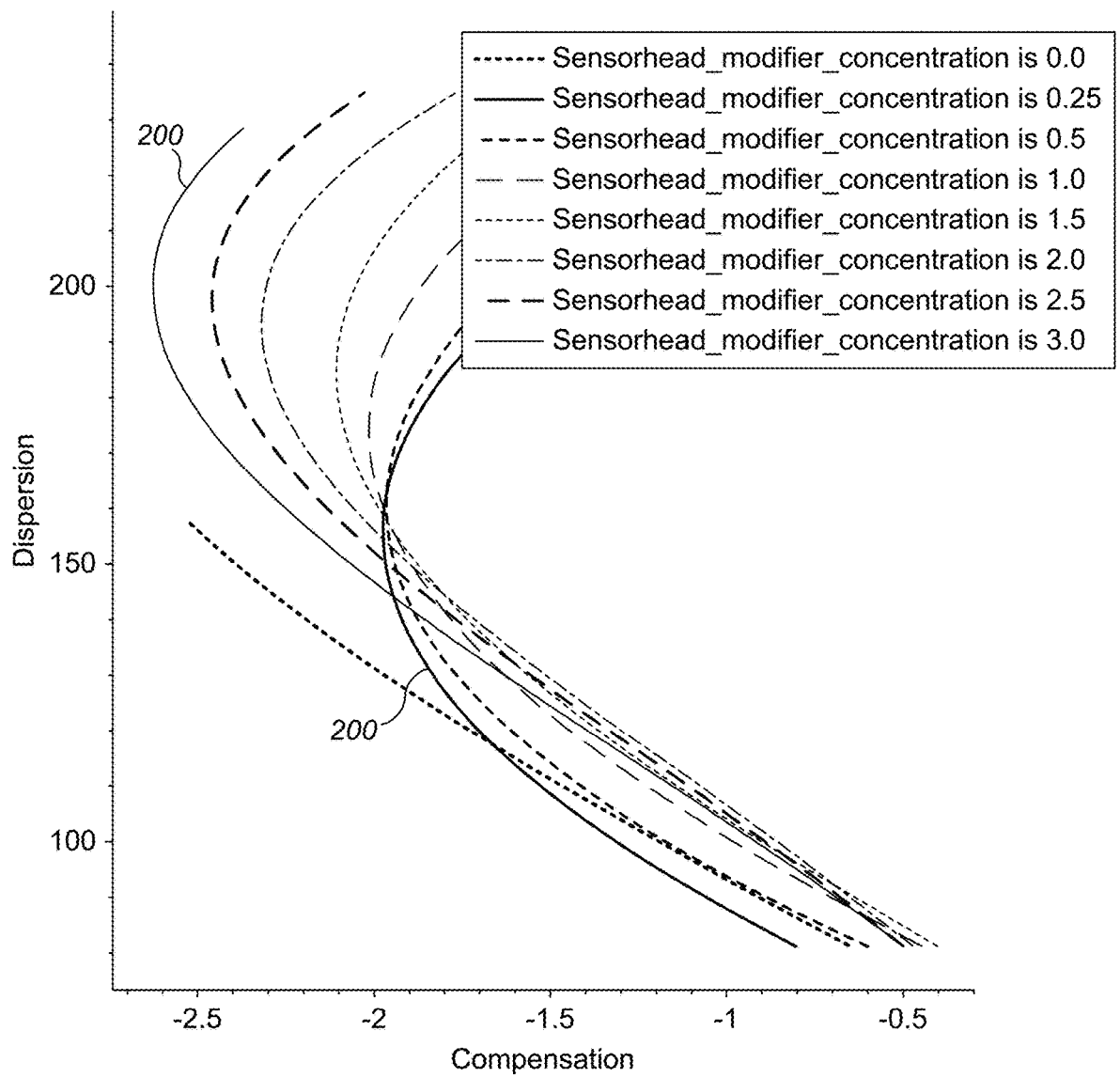
FIG. 4b is a line graph derived from FIG. 4a showing the variation in the peak values for each water concentration plotted as dispersion field versus compensation field.
Figure 4C:
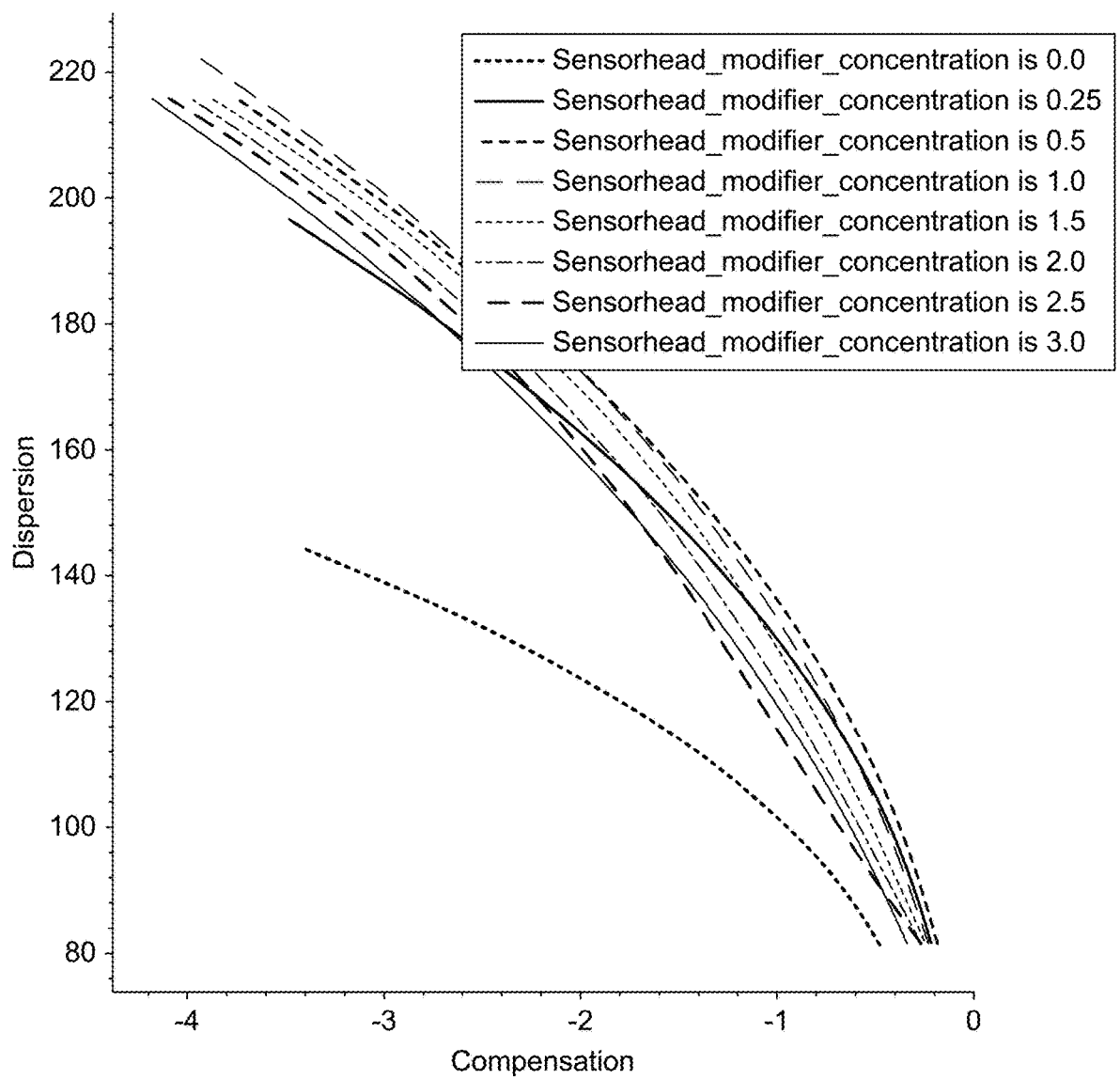
FIG. 4c is a line graph showing the variation in the peak values for each water concentration plotted as dispersion field versus compensation field for the positive mode derived using the results shown in FIGS. 3a to 3d.

Returning to FIG. 2a, the next step S112 is to plot spectra of dispersion field versus compensation field for each of the concentration levels using the data from the previous step. Each spectrum at a particular concentration level is a line which represents a best fit for the extracted points. The spectra are generated using known techniques. These spectra are shown on FIG. 4a but for clarity are reproduced on FIG. 4b without the data points. FIG. 4b thus shows smooth graphs of the variation in dispersion field and compensation field at each concentration level which as shown in this example is at humidity values, of 0%, 0.25%, 0.5%, 1.0%, 1.5%, 2.0%, 2.5% and 3%. FIG. 4b shows the results of the negative mode and FIG. 4c is a similar graph for the positive mode.

Figure 5A:
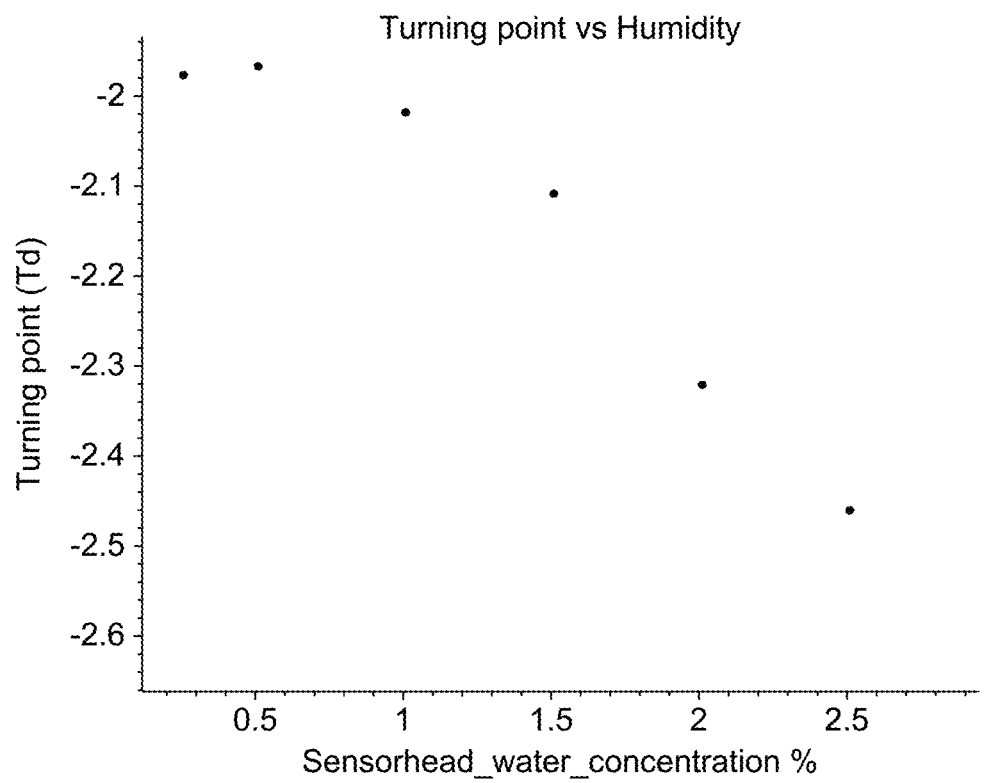
FIG. 5a is a graph plotting the turning point of the dispersion field versus humidity for each of the line graphs shown in FIG. 4b.
Figure 5B:
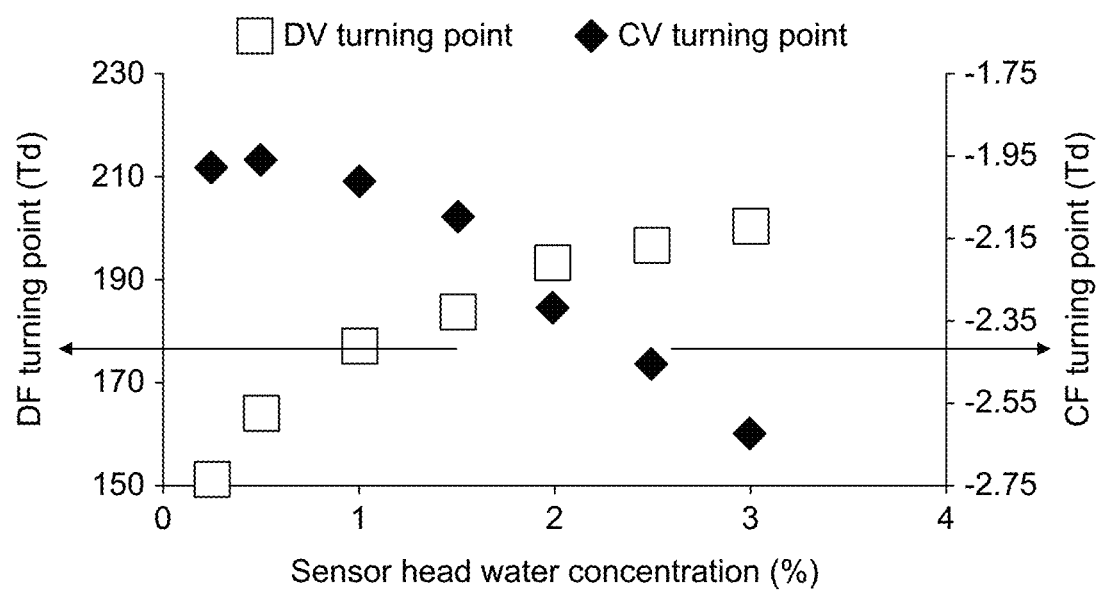
FIG. 5b is a graph plotting the turning point of both the dispersion field and the compensation field versus humidity for each of the line graphs shown in FIG. 4b.

As shown more clearly in the spectra for the negative mode in FIG. 4b, there is a gradual increase in the value of the dispersion field with decreasing value of compensation field until a turning point 200 at which the compensation field begins to increase with increasing dispersions field value. Returning to FIG. 2a, the next step S114 is to extract the value of the compensation field at which these turning points occur in each spectrum. The turning points are extracted using known techniques, for example manually or by fitting a quadratic, differentiating and looking for a zero crossing. These extracted turning points are then plotted on a graph of turning point (measured in Townsends (Td)) against water concentration at the sensor head, i.e. at the location of the FAIMS ion filter itself. FIGS. 5a and 5b illustrate the plots of turning points which are generated for the negative mode. In FIG. 5a, the plots of turning points are for the compensation field only and in FIG. 5b, the turning points for both the compensation and dispersion fields are shown separately. These plots are then stored and can then be used to determine the water concentration (i.e. humidity) in which a system is operating as shown in FIG. 2b. In other words, the spectrometry system can be used as a humidity sensor.

The first step S200 of FIG. 2b is to plot the dispersion field versus compensation field for the spectrometry system. The next step S202 is to determine the locations of peak intensity in the generated plot. The peak intensity spectrum is then plotted at step S204 and the turning point of the spectrum is determined in step S206. It will be appreciated that these steps correspond to those described above in steps S106, S110 to S114 and thus can be done using the techniques described above or other comparable techniques.

As explained above, various factors are known to influence the field dependence of ion mobility, changing peak positions in the DMS spectra. When using the ion mobility system as a humidity sensor, humidity is not known but other key operating parameters such as temperature and pressure can be determined using the appropriate sensors as shown at step S208. These determined parameters may then be used to select the appropriate plot of turning points which is stored in the database (step S210). For example, the plot of FIG. 4b can be selected when the temperature is 150 degrees Celsius. The selected plot and the extracted turning point are then used to determine the humidity.

Figure 6:
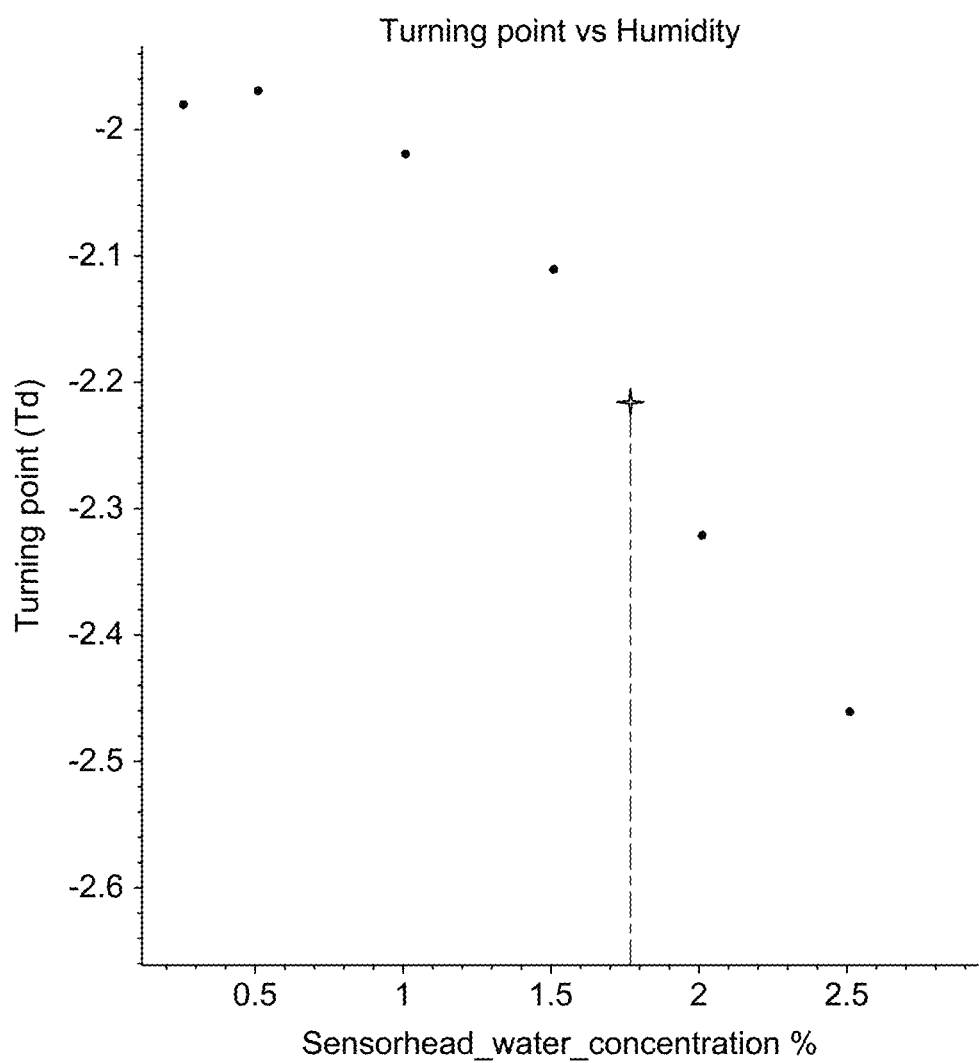

The humidity may be determined as illustrated in FIG. 6. The humidity at the extracted value (which is this example is shown as −2.21) can be determined from FIG. 6 by plotting the extracted value between two known values (one with a value higher than the extracted value and one with a value lower than the extracted values) and extrapolating, by following a line of best fit between these two closest known values, that the humidity value is 1.76% for the extracted turning point. The two known values effectively define a range within which the extracted value is located. It will be appreciated that this is just one way that the value of the humidity can be extracted from the stored values of turning points and humidity and other equivalent methods can be used. For example, the values of turning points and humidity may be stored in a table and extrapolation between the values in the table can used to determine the humidity for a particular turning point.

It will be appreciated that accuracy could be improved by obtaining two turning points, one for the negative mode and one for the positive mode (if turning points exist in both modes) and comparing both of these points with the corresponding graphs. However, if turning points are only available in one mode, accuracy can be improved by using other data, such as the width of each peak or the peak location at a particular value for either the compensation or dispersion field in the mode where there is no turning point.

Figure 5C:
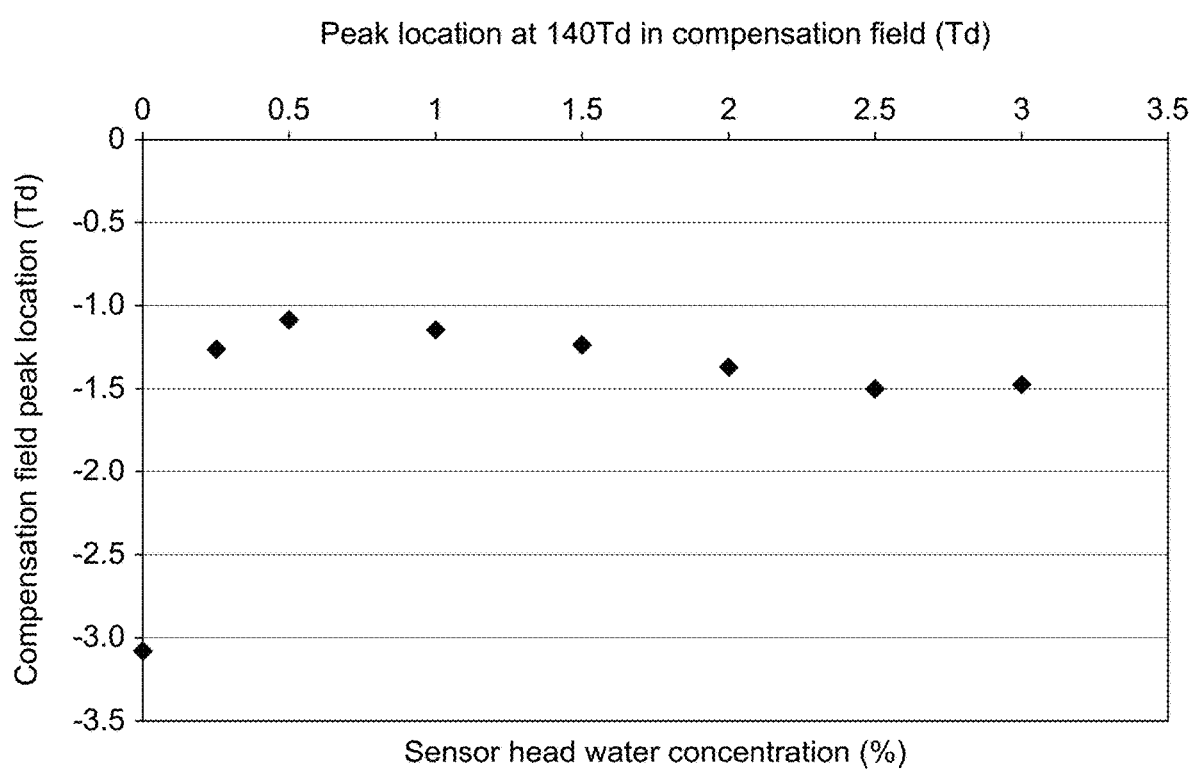
FIG. 5c is a graph plotting peak location at 140 TD in the compensation field for each of the line graphs shown in FIG. 4c.

For example, FIG. 5c plots the value of the peak location at 140 Td in the compensation field against sensor head water concentration. The plot in FIG. 5c can be used to verify the humidity value which is obtained using the method above. For example, the method may comprise calculating the peak location for the compensation field for the gas sample under consideration for the extracted spectrum; determining operating parameters of the field asymmetric ion mobility system; and obtaining, from a database, a plurality of known peak locations each of which have an associated humidity value and each of which were obtained using a field asymmetric ion mobility system having operating parameters aligned with the determined operating parameters; and determining a value for the humidity by comparing the calculated peak location with known peak locations. A humidity value which has been calculated using the turning point may be checked against a humidity value determined using peak location (or vice versa). This is particularly useful if the turning point and/or peak location generates more than one humidity value because a single humidity value which appears in both results may then be selected as the output.

Figure 7A:
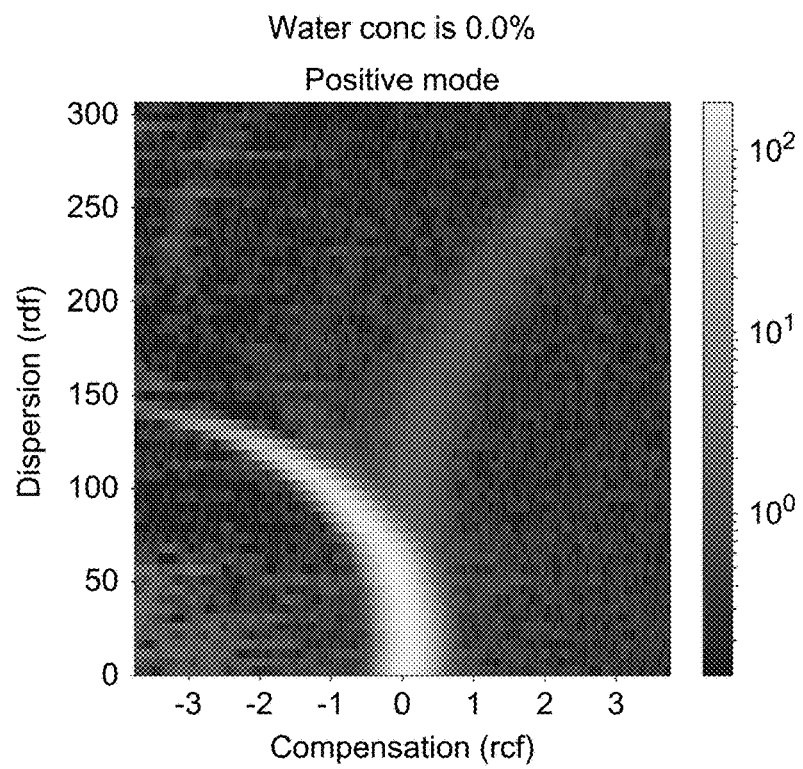
FIGS. 7a to 7c are graphs plotting the dispersion field versus compensation field for the positive mode at water concentrations of 0%, 0.5% and 1.5% for a temperature of 65 degrees Celsius.
Figure 7B:
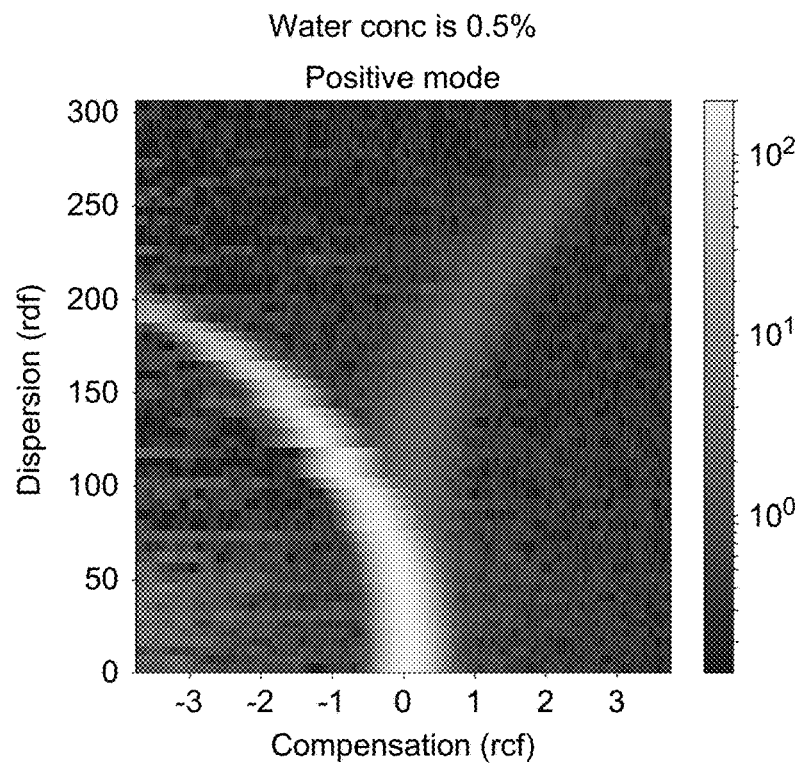
Figure 7C:
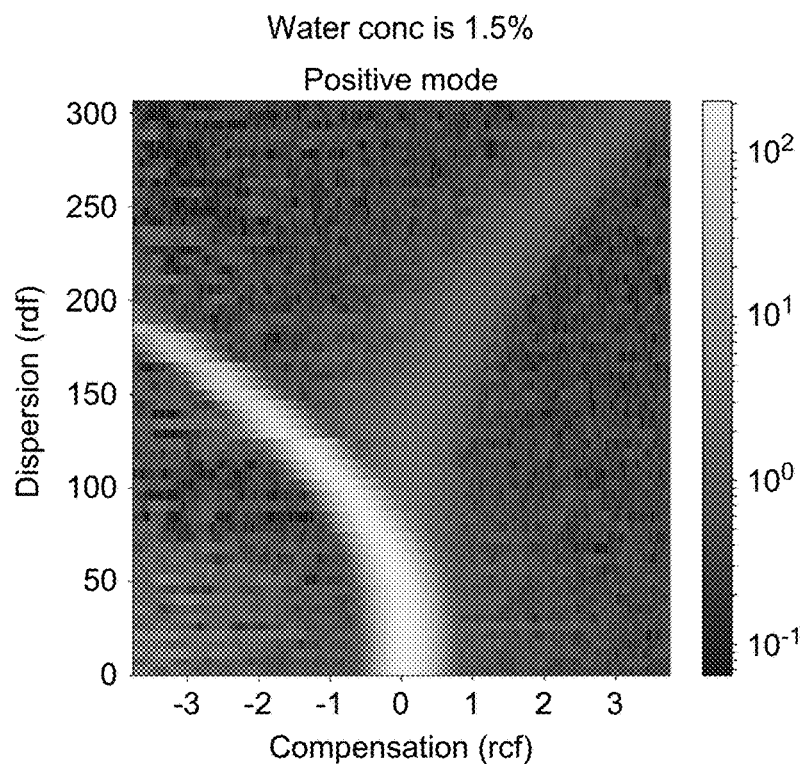
Figure 7D:
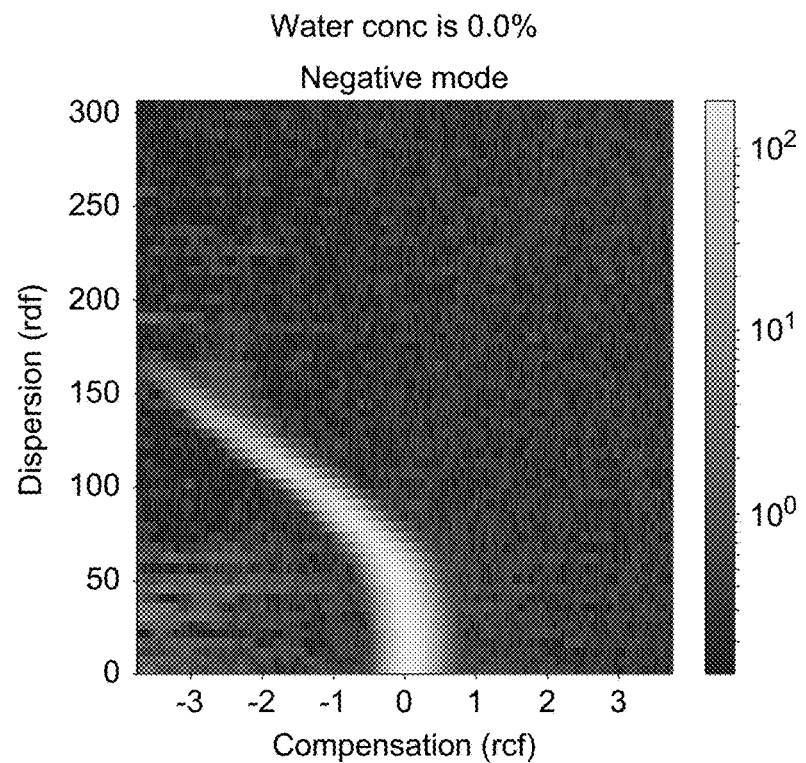
FIGS. 7d to 7f are graphs plotting the dispersion field versus compensation field for the negative mode at water concentrations of 0%, 0.5% and 1.5% for a temperature of 65 degrees Celsius.
Figure 7E:
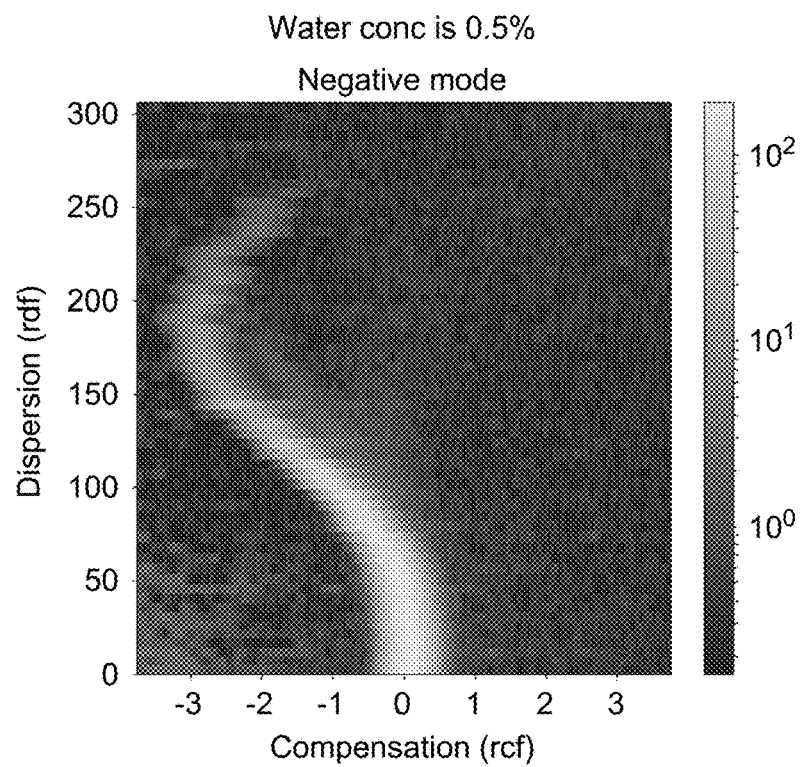
Figure 7F:
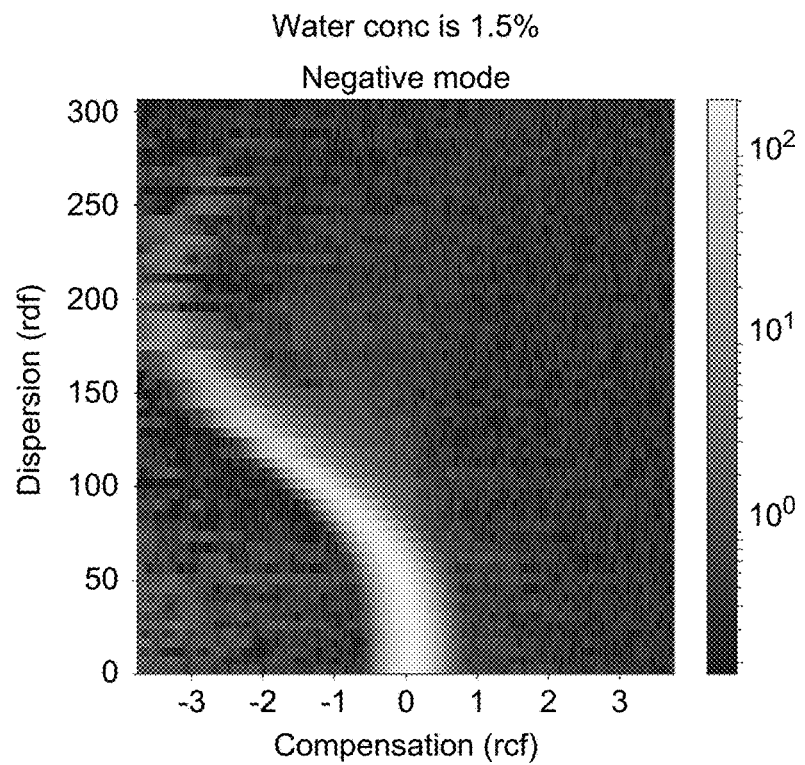

Temperature is a known factor which influences ion mobility. Accordingly, FIGS. 7a to 7f illustrate the calibration process for the same system set at a different temperature of 65 degrees Celsius. FIG. 7a plots the dispersion field against compensation field for the positive mode (i.e. positive ions generated by the chemical sample) at 0% water concentration. Similarly, FIG. 7d plots the dispersion field against compensation field for the negative mode (i.e. positive ions generated by the chemical sample) at 0% water concentration. FIGS. 7b and 7e are the corresponding graphs at a water concentration of 0.5%. Both FIGS. 7b and 7e show a different result when compared to the graphs at a lower water concentration with the change being perhaps the most noticeable for the negative mode and are also different to the graphs at the same concentration at a different temperature. FIGS. 7c and 7f are the corresponding graphs at a water concentration of 1.5%. The change is once again more noticeable for the negative mode. FIGS. 7a to 7f are merely illustrative of the graphs that could be collected at various different water concentrations. The highest intensity is shown as being above $10^2$ (i.e. above 100) with the scale showing $10^1$ is the middle and $10^0$ towards the lower end of the scale.

Figure 8A:
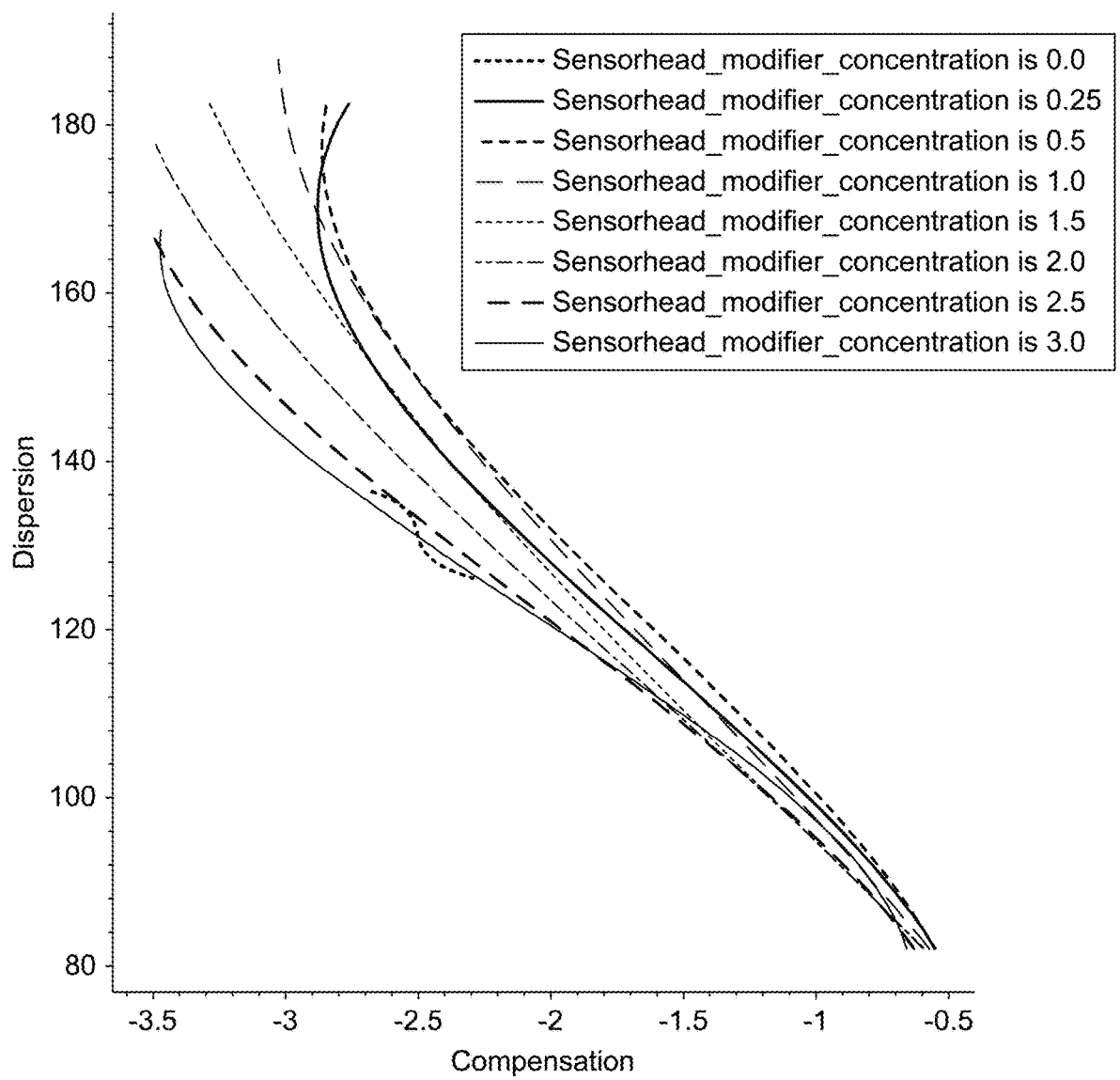
FIGS. 8a and 8b are line graphs showing the variation in the peak values for each water concentration plotted as dispersion field versus compensation field for the negative and positive modes respectively.
Figure 8B:
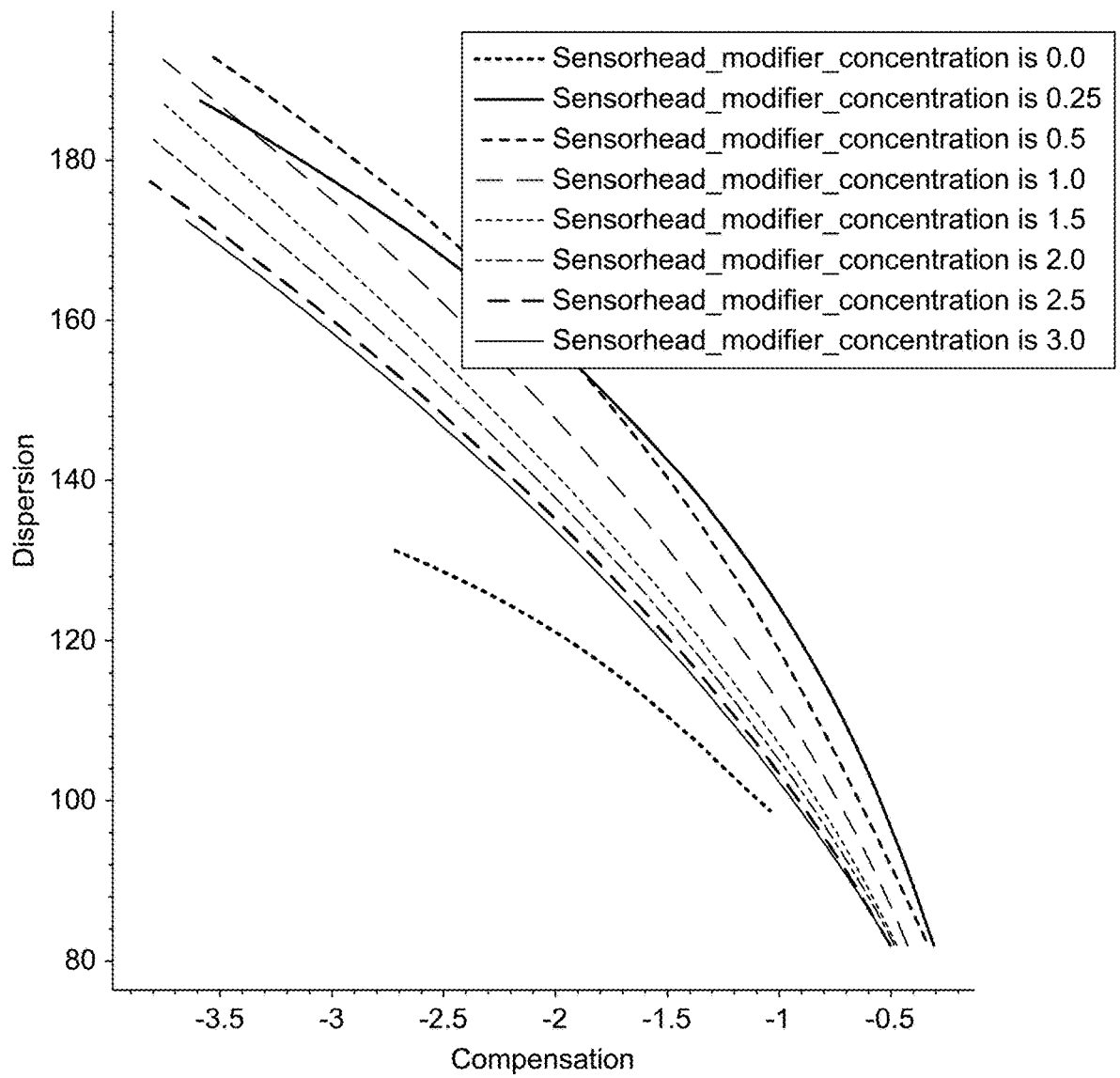

FIGS. 8a and 8b show graphs of the variation in dispersion field and compensation field at each concentration level which as shown in this example is at humidity values, of 0%, 0.25%, 0.5%, 1.0%, 1.5%, 2.0%, 2.5% and 3%. FIG. 8a shows the results of the negative mode and FIG. 8b is a similar graph for the positive mode. These are created using the same techniques described above in relation to FIGS. 4b and 4c but are clearly different in shape to the corresponding FIGS. 4b and 4c.

Figure 9:
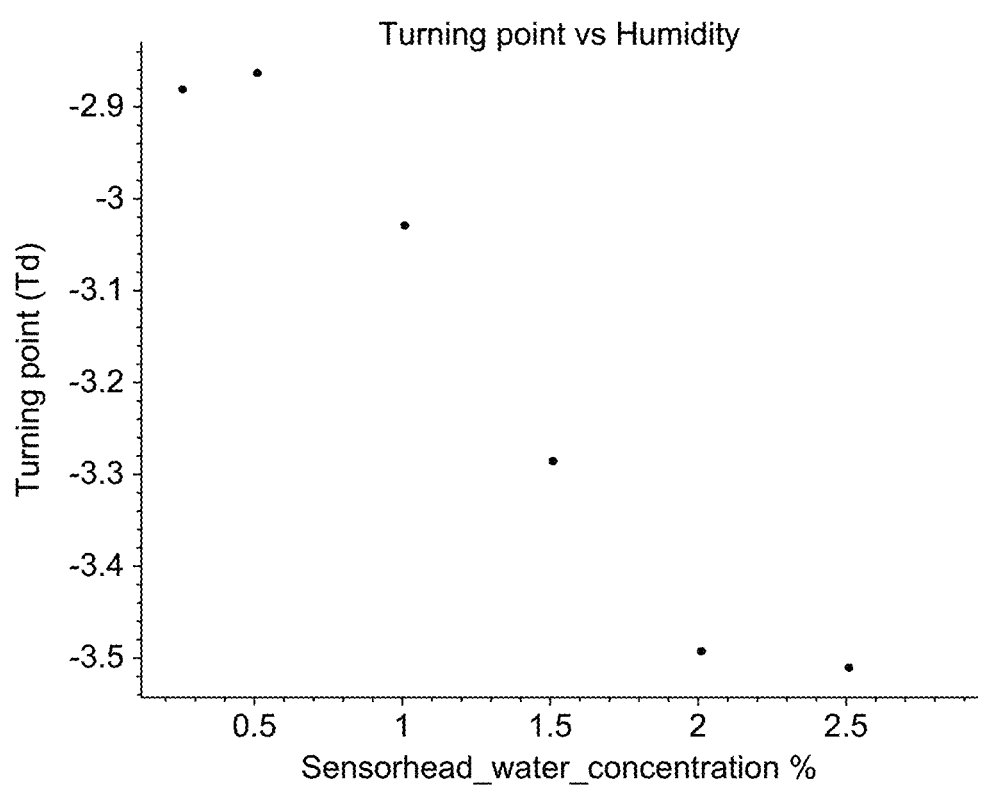

FIG. 9 illustrates the plot of turning points against humidity which are generated for the negative mode respectively. This is created using the same techniques described above in relation to FIGS. 5a and 5b but are clearly different in shape to the corresponding FIGS. 5a and 5b. Accordingly, these would give a different result in the final step of FIG. 2b and thus it is important to select the correct data plot to use for the analysis.

As shown in FIG. 6 (and FIG. 9), between 0.25% and 2.5% a single value of humidity is likely to be determined for each turning point. Moreover, there is good differentiation between the turning points in these ranges. Below the value of 0.25%, there is a steep drop in the value of the turning point against concentration. Accordingly, there is a second humidity value for many of the turning point values. However, it is possible to discount these values because they represent an almost completely dry environment which is unlikely.

Figure 10A:
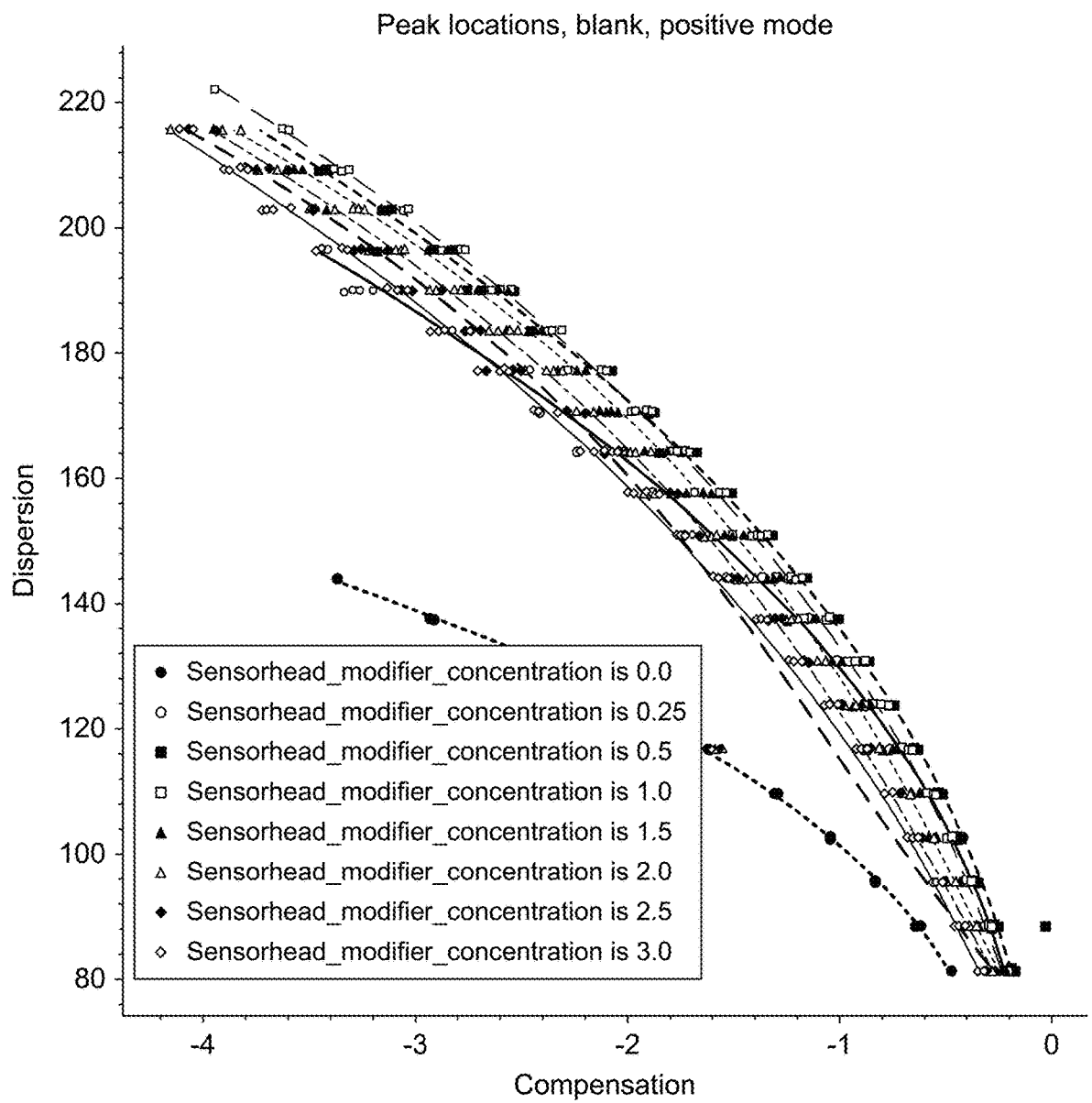
FIG. 10a is a graph plotting the locations of the peak values in the dispersion field versus compensation field graphs shown in FIGS. 3a to 3d.

FIG. 10a plots the locations of each extracted peak at the different concentrations in the positive mode for 150 degrees Celsius. This is determined in a similar manner to FIG. 4a for the negative mode. FIGS. 10b to 10e show the full peak widths at half maximum (FWHM) for a plurality of these peak locations. The number of peak locations which are considered when determining the peak widths may be reduced by considering only ranges of compensation and dispersion field values, e.g. compensation field below 0 Td and dispersion field above 100 Td for the positive mode and compensation field below −1.4 Td and dispersion field above 125 Td for the negative mode. For example, in FIGS. 10b to 10e approximately five locations may be considered for both the positive and negative modes. Each of FIGS. 10b to 10e thus plots multiple widths for each humidity value because there are multiple corresponding points in FIGS. 10a and 4a.

Figure 10B:
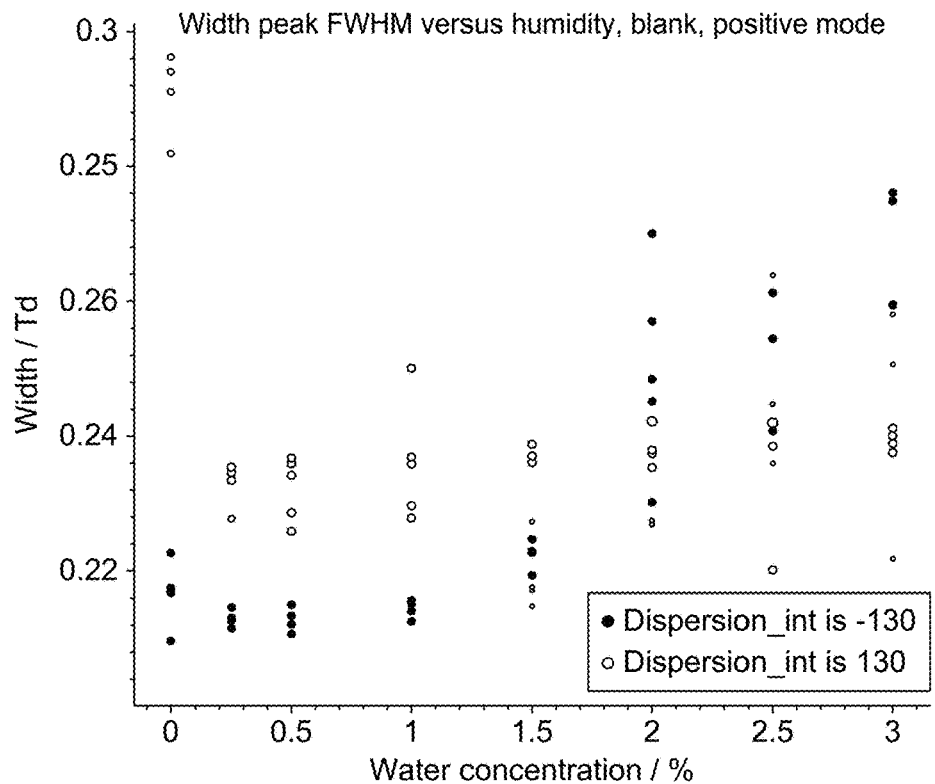
FIGS. 10b, 10c, 10d and 10e are graphs plotting the widths of each of the peaks shown in FIG. 10a and FIG. 4a against humidity for reference values of ±130, ±150, ±170 and ±190 respectively.
Figure 10C:
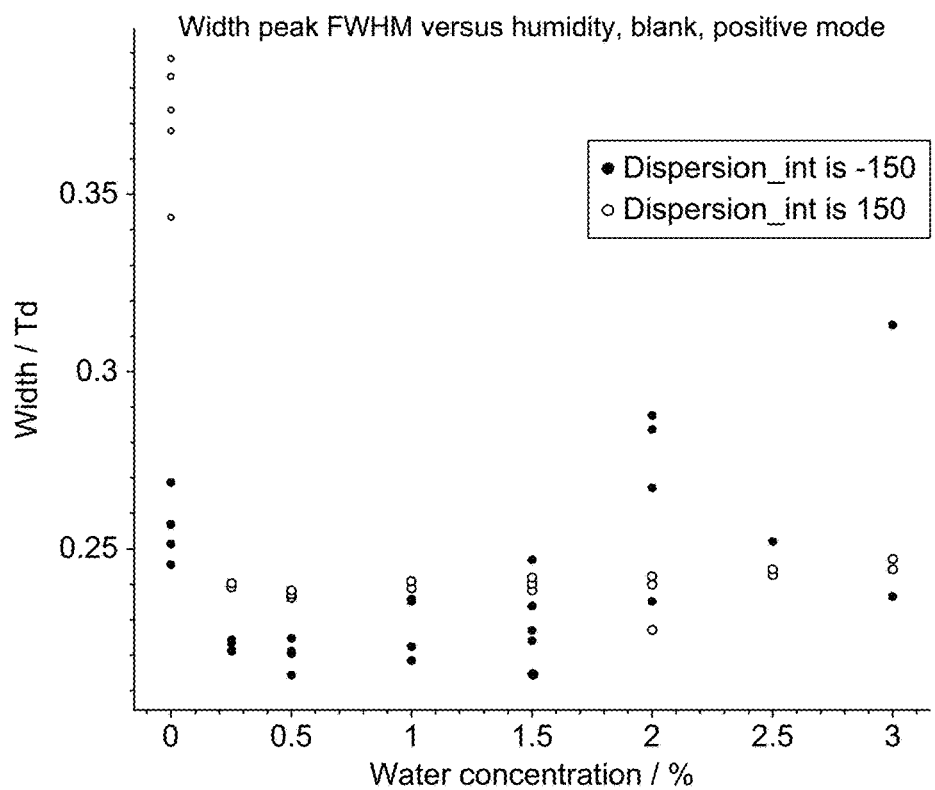
Figure 10D:
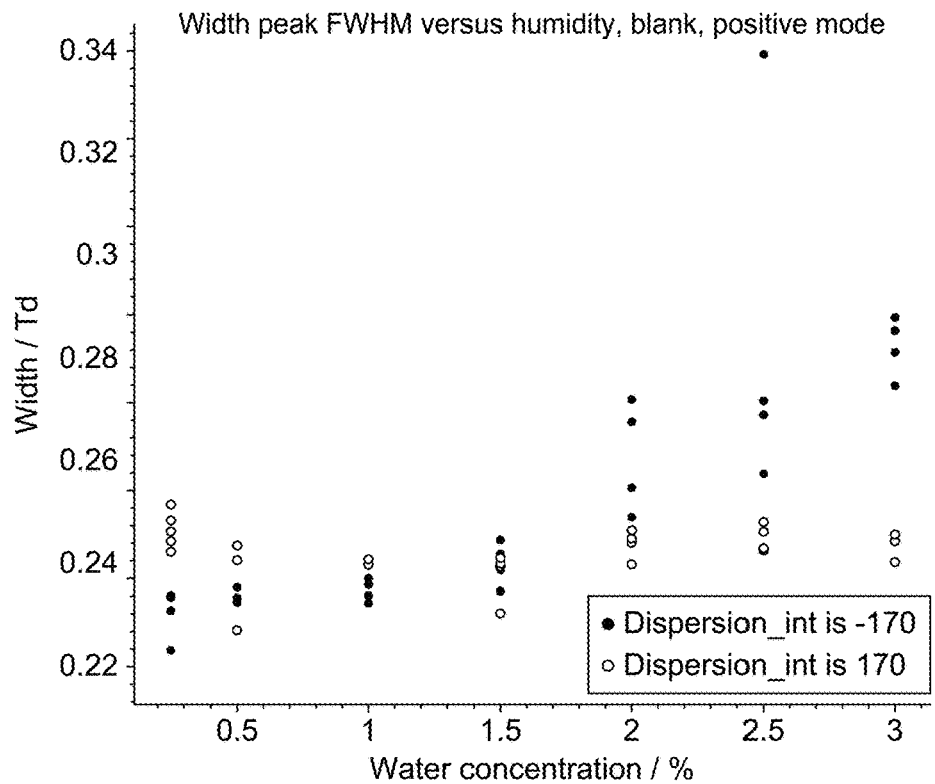
Figure 10E:
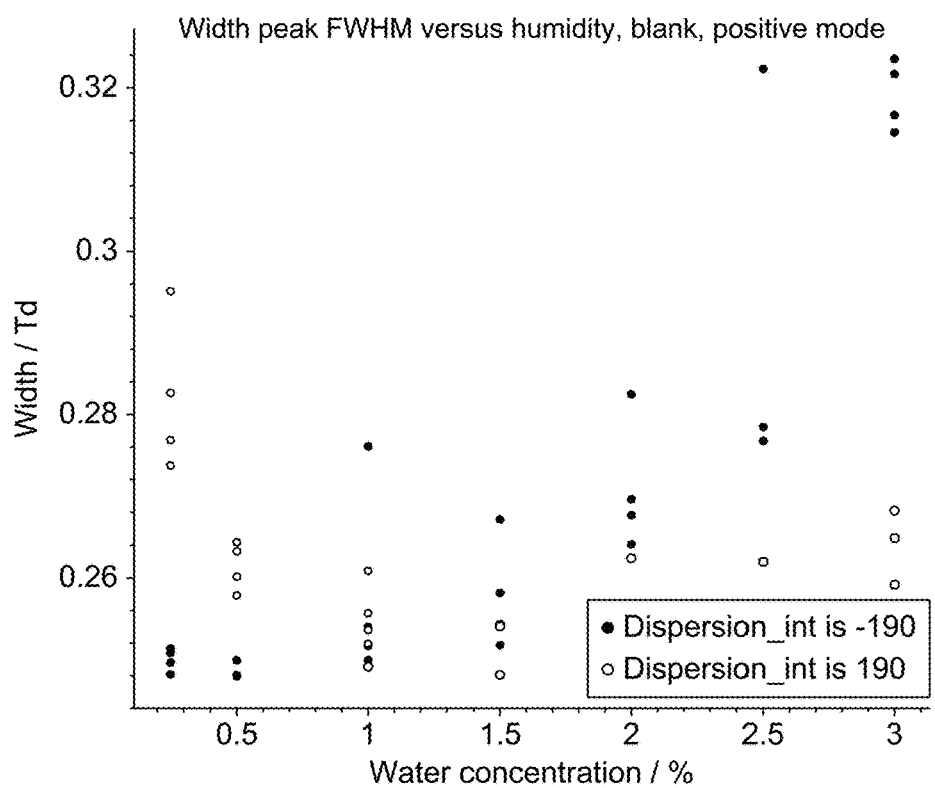

FIG. 10b shows the peak width for multiple peak locations at reference values of 130 Td (positive mode) and −130 Td (negative mode). FIG. 10c shows the peak width for the reference values of the dispersion field of 150 Td (positive mode) and −150 Td (negative mode) respectively. FIG. 10d shows the peak width for the reference values of the dispersion field of 170 Td (positive mode) and −170 Td (negative mode) respectively. FIG. 10e shows the peak width for the reference values of the dispersion field of 190 Td (positive mode) and −190 Td (negative mode) respectively.

Figure 11A:
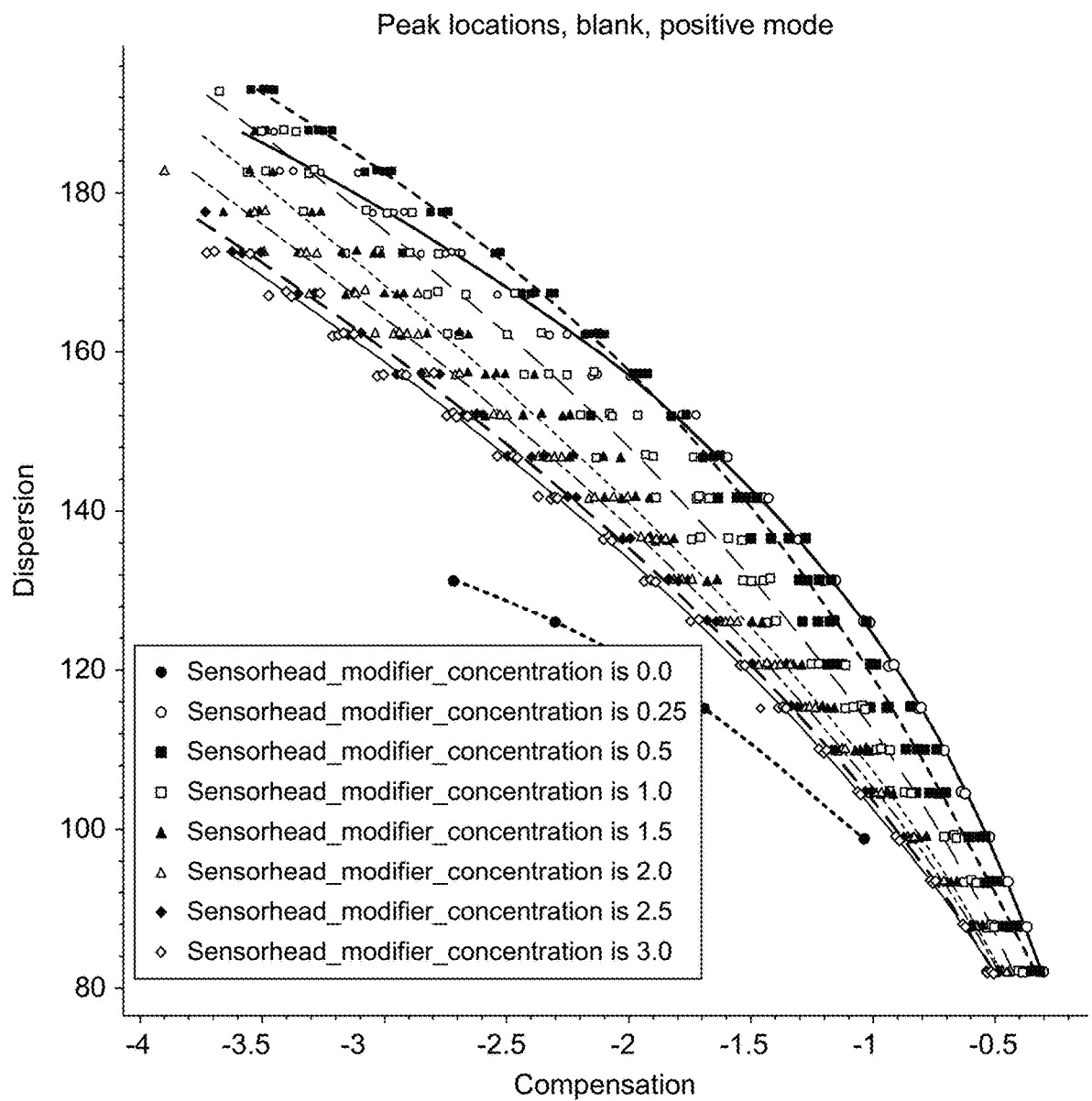
FIG. 11a is a graph plotting the locations of the peak values in the dispersion field versus compensation field graphs shown in FIGS. 7a to 7c.
Figure 11B:
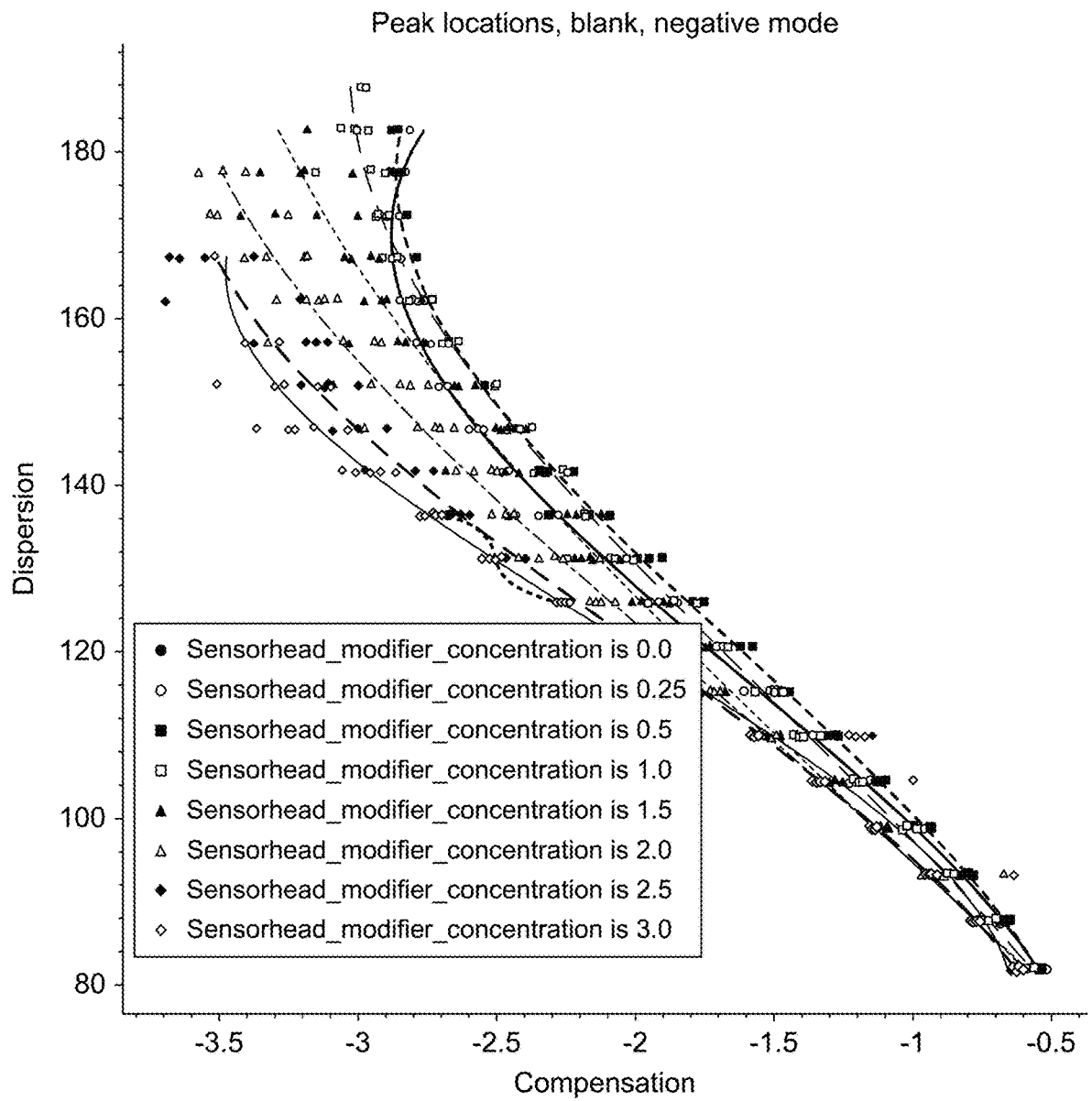
FIG. 11b is a graph plotting the locations of the peak values in the dispersion field versus compensation field graphs shown in FIGS. 7d to 7f and FIGS. 11c, 11d and 11e are graphs plotting the widths of each of the peaks shown in FIGS. 11a and 11b against humidity for reference values of ±131, ±141 and ±151 respectively.
Figure 11C:
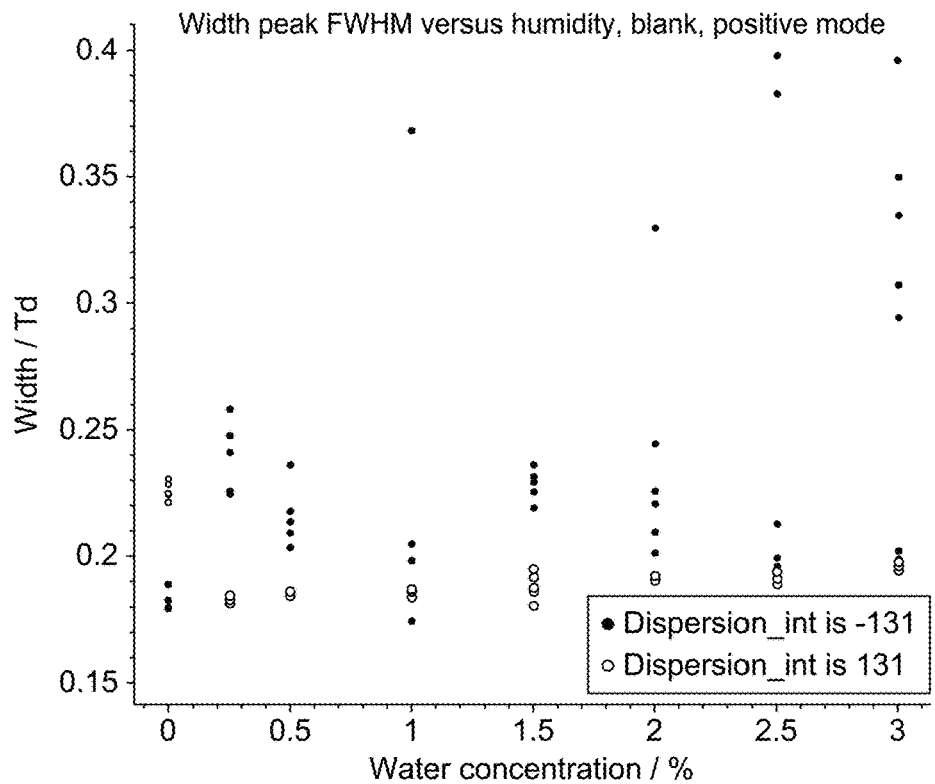
Figure 11D:
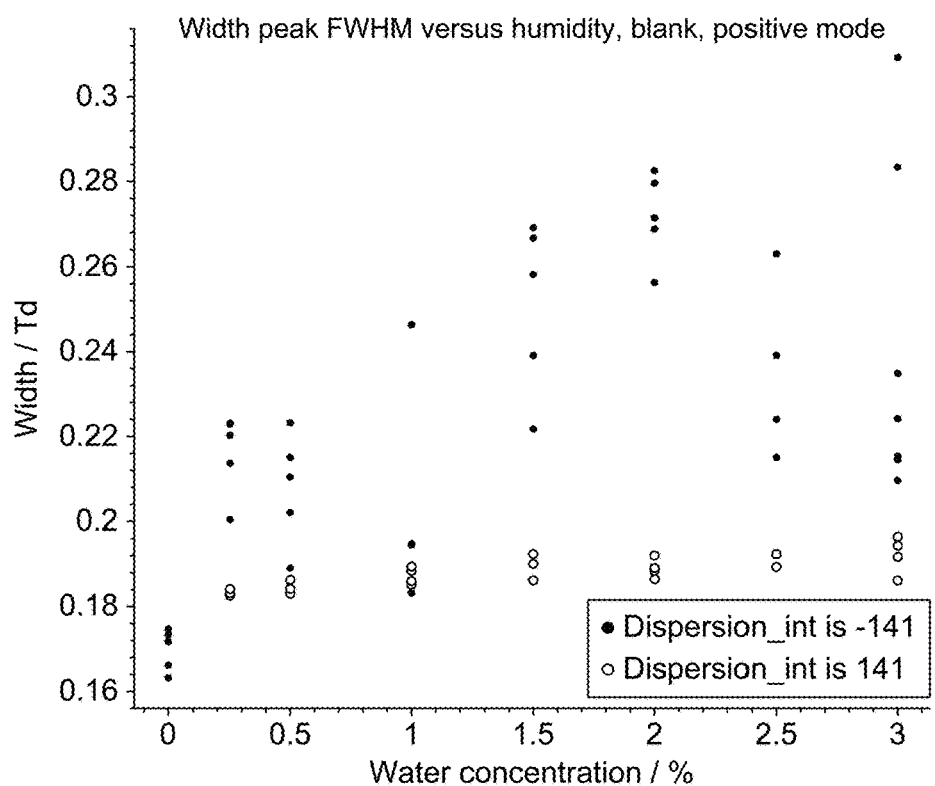
Figure 11E:
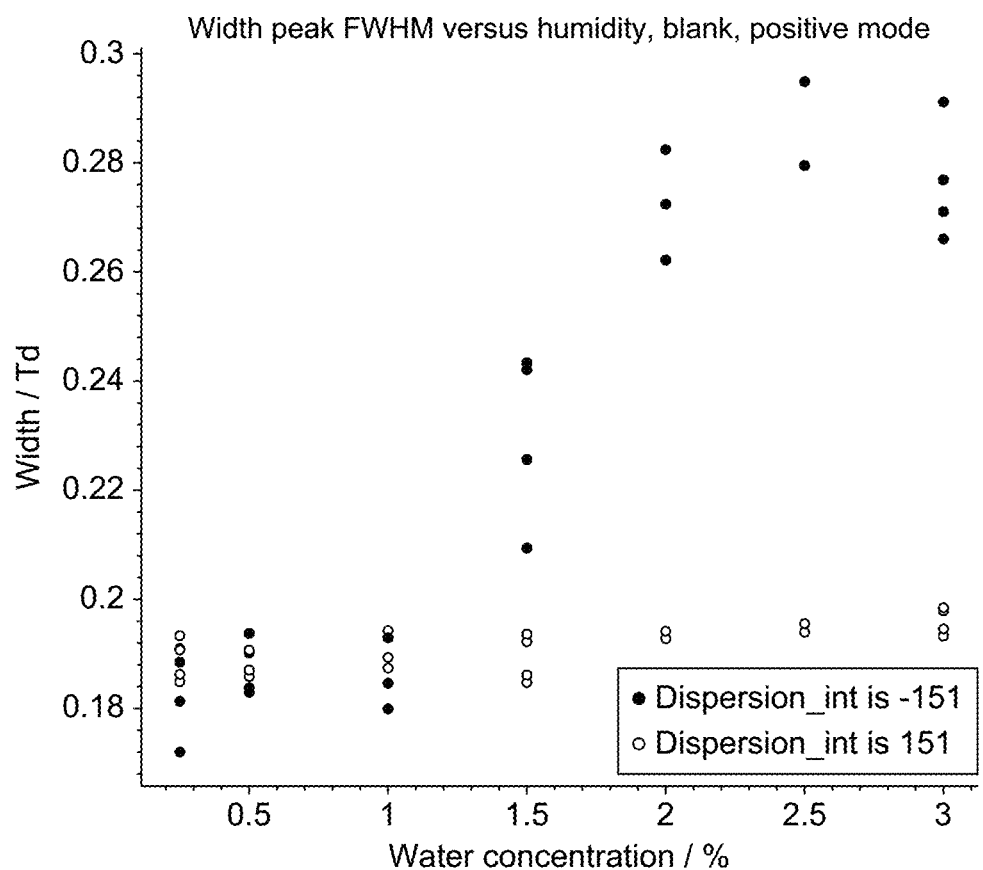

Similarly FIGS. 11a and 11b plot the locations of each extracted peak at the different concentrations in the positive mode and negative mode respectively for 65 degrees Celsius. FIGS. 11c to 11e show the full peak widths at half maximum (FWHM) for each of the peak locations. As above, the number of peak locations which are considered may be reduced. FIG. 11c shows the peak width for the reference values of the dispersion field of 131 Td (positive mode) and −131 Td (negative mode) respectively. FIG. 11d shows the peak width for the reference values of the dispersion field of 141 Td (positive mode) and −141 Td (negative mode) respectively. FIG. 11e shows the peak width for the reference values of the dispersion field of 151 Td (positive mode) and −151 Td (negative mode) respectively.

The humidity value can be determined from peak width by plotting the dispersion field against compensation field and extracting the locations of peak intensity as per steps S200 and S202 in the method of FIG. 2b. Thereafter, the widths of the locations of peak intensity which are extracted in step S202 can be determined. The system parameters are also determined as in step S208 of FIG. 2b. In this case, rather than obtaining a stored plot of turning points, a stored plot of peak width against humidity for the system having aligned parameters is obtained and the humidity is determined using this stored plot. Although each of the peak width plots of FIGS. 10b to 11e shows various concentration values having a particular peak width, it is possible that some systems have parameters which do not produce multiple values and thus the humidity value can be uniquely determined. Alternatively, the plots can be used to cross-reference (i.e. double check) a humidity value which has been calculated using the turning point as described above. This is particularly useful if the turning point method generates more than one humidity value because the correct one can then be selected as the one which corresponds to a humidity value determined using the peak width.

At least some of the example embodiments described herein may be constructed, partially or wholly, using dedicated special-purpose hardware. Terms such as 'processor' or 'controller' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although a few preferred embodiments of the present invention have been shown and described, it will be appreciated by those skilled in the art that various changes and modifications might be made without departing from the scope of the invention, as defined in the appended claims.

The invention claimed is:

1. A method of determining humidity using a field asymmetric ion mobility system, the method comprising:
   generating ions within a gas sample flowing through the field asymmetric ion mobility system,
   applying a compensation field and a dispersion field to the generated ions;
   measuring an output ion current;
   extracting a spectrum of peak intensity of the measured output as a function of the compensation field and the dispersion field;
   calculating a turning point for the extracted spectrum;
   determining operating parameters of the field asymmetric ion mobility system;
   obtaining, from a database, a plurality of known turning points each of which have an associated humidity value and each of which were obtained using a field asymmetric ion mobility system having operating parameters aligned with the determined operating parameters; and
   determining a value for the humidity by comparing the calculated turning point with known turning points.

2. The method of claim 1, wherein extracting a spectrum of peak intensity comprises:
   plotting the measured output ion current as a function of dispersion field against compensation field;
   determining points of peak intensity within the plot; and
   generating the spectrum of the peak intensity using the determined points.

3. The method of claim 1, wherein extracting a spectrum of peak intensity comprises generating a line graph of peak intensity as a function of the compensation field and the dispersion field.

4. The method of claim 3, wherein calculating a turning point comprises calculating the turning point in the generated line graph.

5. The method of claim 1, wherein determining a value for the humidity comprises determining a pair of known turning points defining a range within which the calculated turning point is located and extrapolating a humidity value for the calculated turning point from the humidity values associated with the pair of known turning points.

6. The method of claim 5, wherein determining the humidity comprises determining two pairs of known turning points each of which define a range within which the calculated turning point is located, selecting a preferred pair and extrapolating the humidity value using the preferred pair.

7. The method of claim 1, further comprising:
   generating positive and negative ions,
   wherein extracting the spectrum of peak intensity comprises extracting a first spectrum of peak intensity for the negative ions,
   wherein obtaining, from the database, comprises obtaining a first plurality of known turning points each of which have an associated humidity and each of which were obtained using negative ions, and
   wherein determining the humidity value comprises determining a first humidity value.

8. The method of claim 7, further comprising:
   extracting a second spectrum of peak intensity for the positive ions;
   calculating a second turning point from the second spectrum of peak intensity;
   obtaining a second plurality of known turning points each of which have an associated humidity and each of which were obtained using positive ions; and
   determining a second humidity value by comparing the second calculated turning point with the second plurality of known turning points.

9. The method of claim 8, further comprising comparing the first and the second determined humidity values and selecting one of the first and second humidity values as the determined humidity value.

10. The method of claim 1, further comprising determining the humidity value by using peak width or location.

11. The method of claim 10, further comprising comparing the humidity value determined using peak width or location with the humidity value determined using turning points.

12. The method of claim 1, further comprising building the database including:
    setting the operating parameters of a test field asymmetric ion mobility system, wherein the operating parameters include the humidity of a gas sample being sampled by the system;
    generating ions within the gas sample flowing through the test field asymmetric ion mobility system;
    applying a compensation field and a dispersion field to the generated ions;
    measuring an output ion current;
    extracting a spectrum of peak intensity of the measured output as a function of the compensation field and the dispersion field;
    calculating a turning point for the extracted spectrum; and
    storing the calculated turning point together with the set operating parameters wherein the calculated turning point is associated with the set humidity.

13. The method of claim 12, further comprising calculating peak location and/or peak width for the extracted spectrum; and storing the calculated peak location and/or peak width together with the set operating parameters wherein the calculated peak location and/or peak width is associated with the set humidity.

14. The method of claim 12, further comprising adjusting the humidity of the gas sample flowing through the test field asymmetric ion mobility system and repeating the generating, applying, measuring, extracting and storing steps.

15. The method of claim 12, further comprising adjusting an operating parameter of the test field asymmetric ion mobility system and repeating the generating, applying, measuring, extracting and storing steps.

16. A spectrometry system comprising:
   an ionizer for generating ions within a gas sample, wherein each ion has an associated ion mobility;
   an ion filter for separating the ions by applying a compensation field and a dispersion field to the generated ions;
   a detector for detecting an output from the ion filter; and
   a processor configured to: extract a spectrum of peak intensity of the detected output as a function of the compensation field and the dispersion field;
   calculate a turning point for the extracted spectrum;
   determine operating parameters of the field asymmetric ion mobility system;
   obtain, from a database, a plurality of known turning points each of which have an associated humidity and each of which were obtained using a field asymmetric ion mobility system having operating parameters aligned with the determined operating parameters; and
   determine the humidity by comparing the calculated turning point with known turning points.

* * * * *